United States Patent
Dudley et al.

(10) Patent No.: US 9,865,906 B2
(45) Date of Patent: Jan. 9, 2018

(54) BATTERY SYSTEM AND METHOD OF ASSEMBLING THE BATTERY SYSTEM

(71) Applicant: LG Chem, Ltd., Seoul (KR)

(72) Inventors: Scott Dudley, Commerce Township, MI (US); Robert Merriman, Shelby Township, MI (US); Heekook Yang, Troy, MI (US)

(73) Assignee: LG Chem, Ltd., Seoul (KR)

( * ) Notice: Subject to any disclaimer, the term of this patent is extended or adjusted under 35 U.S.C. 154(b) by 147 days.

(21) Appl. No.: 15/141,538

(22) Filed: Apr. 28, 2016

(65) Prior Publication Data

US 2017/0301969 A1    Oct. 19, 2017

Related U.S. Application Data

(60) Provisional application No. 62/322,851, filed on Apr. 15, 2016.

(51) Int. Cl.
*H01M 2/10* (2006.01)
*H01M 6/02* (2006.01)
(Continued)

(52) U.S. Cl.
CPC ......... *H01M 10/6554* (2015.04); *H01M 2/10* (2013.01); *H01M 6/02* (2013.01);
(Continued)

(58) Field of Classification Search
CPC .................... H01M 10/6554; H01M 10/655
See application file for complete search history.

(56) References Cited

U.S. PATENT DOCUMENTS

| | | |
|---|---|---|
| 6,783,630 B2 | 8/2004 | Shajii et al. |
| 7,166,187 B2 | 1/2007 | Shajii et al. |

(Continued)

FOREIGN PATENT DOCUMENTS

| | | |
|---|---|---|
| JP | 2009301877 A | 12/2009 |
| JP | 2012015040 A | 1/2012 |

(Continued)

OTHER PUBLICATIONS

International Search Report for Application No. PCT/KR2017/003751 dated Jul. 14, 2017.

*Primary Examiner* — Matthew J Merkling
(74) *Attorney, Agent, or Firm* — Buckert Patent & Trademark Law Firm PC; John F. Buckert

(57) ABSTRACT

A battery system and a method of assembling the battery system are provided. The battery system includes a thermally conductive base member, a thermal transfer member, a thermally conductive adhesive portion, and a battery module. The thermal transfer member has a metal plate with a top portion and a bottom portion. The bottom portion is disposed on the thermally conductive base member. The top portion has a substantially arcuate-shaped groove extending inwardly into the metal plate. The thermally conductive adhesive portion is disposed in the substantially arcuate-shaped groove. The battery module having a first pouch-type battery cell with a first outer housing with a first end portion. The first end portion is disposed on the thermally conductive adhesive portion and is disposed above the arcuate-shaped groove.

14 Claims, 18 Drawing Sheets

(51) Int. Cl.
  *H01M 10/04*     (2006.01)
  *H01M 10/6554*   (2014.01)
  *H01M 6/50*      (2006.01)
  *H01M 10/613*    (2014.01)
  *H01M 10/653*    (2014.01)
  *H01M 10/6556*   (2014.01)

(52) U.S. Cl.
  CPC ......... *H01M 6/5038* (2013.01); *H01M 10/04* (2013.01); *H01M 10/613* (2015.04); *H01M 10/653* (2015.04); *H01M 10/6556* (2015.04)

(56) References Cited

U.S. PATENT DOCUMENTS

| | | | | |
|---|---|---|---|---|
| 2014/0087231 | A1* | 3/2014 | Schaefer | H01M 10/5053 429/120 |
| 2014/0370340 | A1* | 12/2014 | Kimura | H01M 2/1077 429/72 |
| 2015/0064540 | A1* | 3/2015 | Roh | B60L 11/1874 429/153 |
| 2015/0357688 | A1* | 12/2015 | Heeg | H01M 10/625 429/120 |
| 2016/0036102 | A1* | 2/2016 | Suzuki | H01M 10/6567 429/120 |
| 2017/0125756 | A1* | 5/2017 | Nietling | H01M 2/1077 |

FOREIGN PATENT DOCUMENTS

| | | |
|---|---|---|
| KR | 20090079802 A | 7/2009 |
| KR | 20140037452 A | 3/2014 |
| KR | 20160013899 A | 2/2016 |

\* cited by examiner

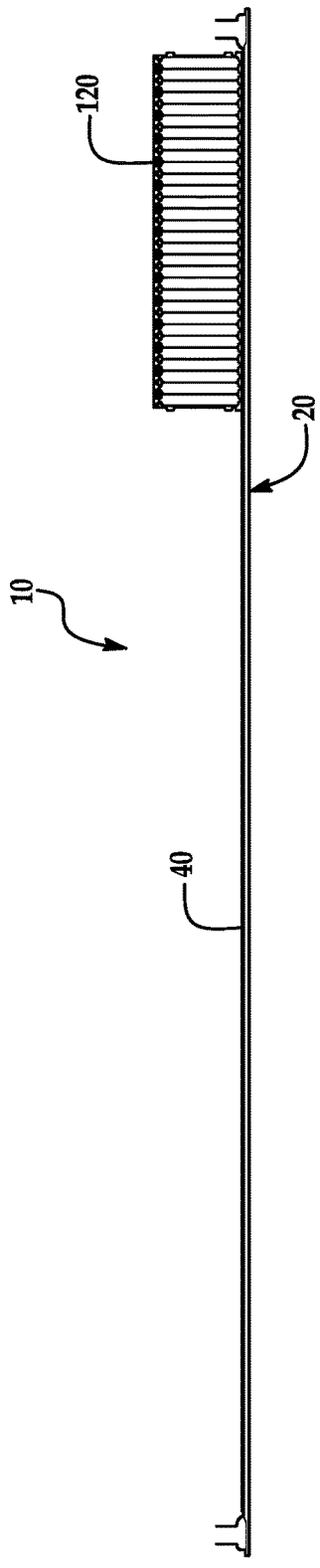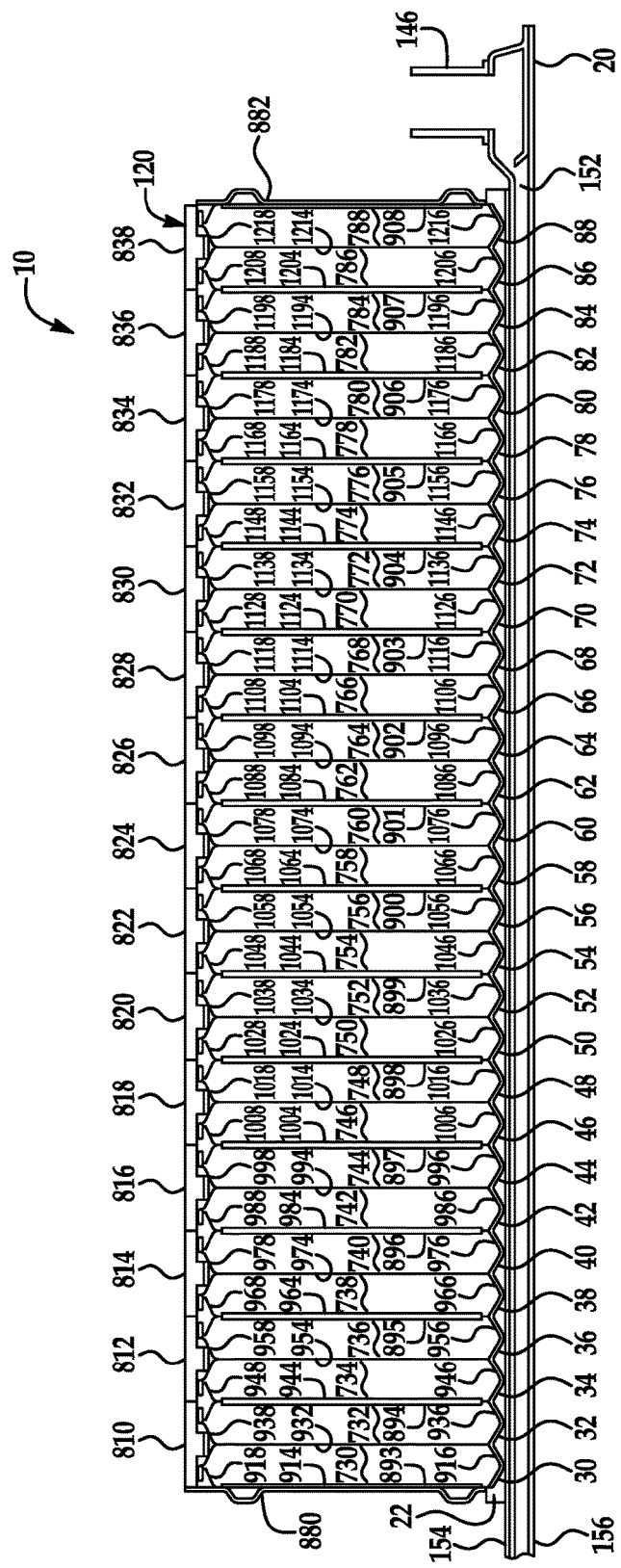

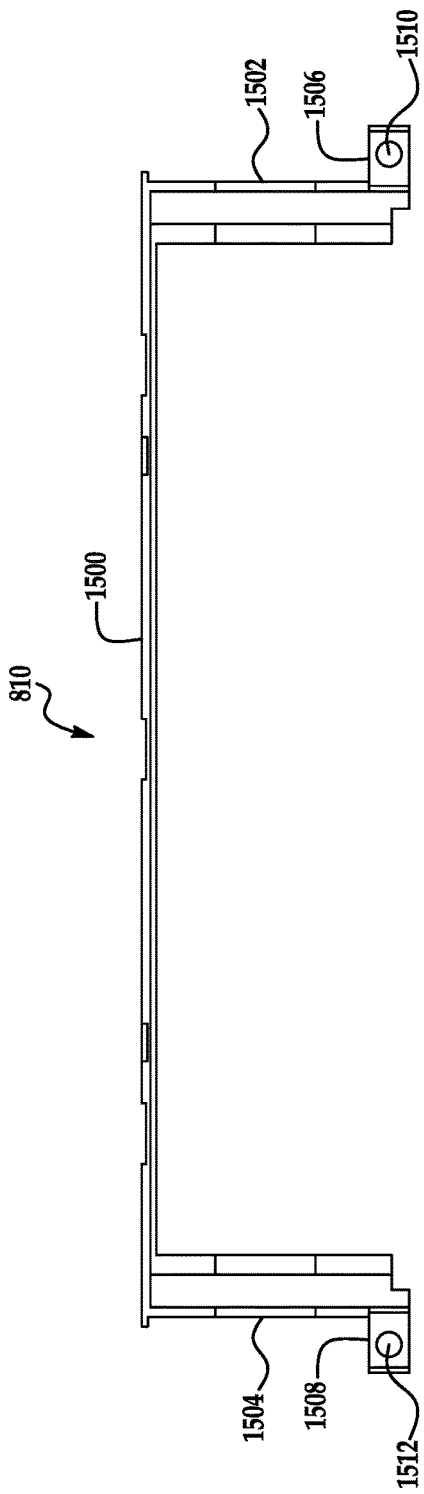
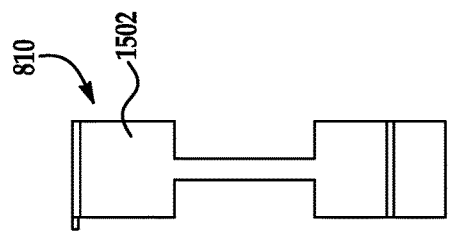
FIG. 19
FIG. 18

US 9,865,906 B2

BATTERY SYSTEM AND METHOD OF ASSEMBLING THE BATTERY SYSTEM

CROSS-REFERENCE TO RELATED APPLICATION

This application claims priority to U.S. Provisional Patent Application No. 62/322,851 filed on Apr. 15, 2016, the entire contents of which are hereby incorporated by reference herein.

BACKGROUND

The inventors herein have recognized a need for an improved battery system for cooling pouch-type battery cells therein.

SUMMARY

A battery system in accordance with an exemplary embodiment is provided. The battery system includes a thermally conductive base member having a housing and a thermally conductive base layer. The thermally conductive base layer is coupled to a top surface of the housing. The battery system further includes a thermal transfer member having a metal plate with a top portion and a bottom portion. The bottom portion of the metal plate is disposed on the thermally conductive base layer. The top portion of the metal plate has a first substantially arcuate-shaped groove extending inwardly into the metal plate. The battery system further includes a first thermally conductive adhesive portion that is disposed in the first substantially arcuate-shaped groove of the metal plate. The battery system further includes a battery module having a first pouch-type battery cell. The first pouch-type battery cell has a first outer housing with a first end portion and a second end portion. The first end portion of the first outer housing of the first pouch-type battery cell is disposed directly on the first thermally conductive adhesive portion and is disposed directly above the first substantially arcuate-shaped groove of the metal plate such that the first thermally conductive adhesive portion fixedly couples the first end portion of the first outer housing of the first pouch-type battery cell to the metal plate.

A method for assembling a battery system in accordance with another exemplary embodiment is provided. The method includes providing a thermally conductive base member, a thermal transfer member, a first thermally conductive adhesive portion, and a battery module. The thermal transfer member has a metal plate with a top portion and a bottom portion. The top portion of the metal plate has a first substantially arcuate-shaped groove extending inwardly into the metal plate. The battery module has a first pouch-type battery cell. The first pouch-type battery cell has a first outer housing with a first end portion and a second end portion. The method further includes disposing the first thermally conductive adhesive portion in the first substantially arcuate-shaped groove of the metal plate, utilizing an adhesive dispensing device. The method further includes positioning the battery module such that the first end portion of the first pouch-type battery cell is disposed directly on the first thermally conductive adhesive portion and directly above the first substantially arcuate-shaped groove of the metal plate, utilizing a placement machine, such that the first thermally conductive adhesive portion couples the first end portion of the first outer housing of the first pouch-type battery cell to the metal plate of the thermal transfer member. The method further includes disposing the bottom portion of the metal plate of the thermal transfer member on the thermally conductive base member, utilizing the placement device.

BRIEF DESCRIPTION OF THE DRAWINGS

FIG. 3 is a cross-sectional view of the battery system of FIG. 1 taken along lines 3-3 of FIG. 1;

FIG. 4 is an enlarged cross-sectional view of a portion of the battery system of FIG. 1;

FIG. 18 is a side view of the plastic frame member of FIG. 17;

FIG. 19 is a front view of the plastic frame member of FIG. 17;

DETAILED DESCRIPTION

Figure 1:
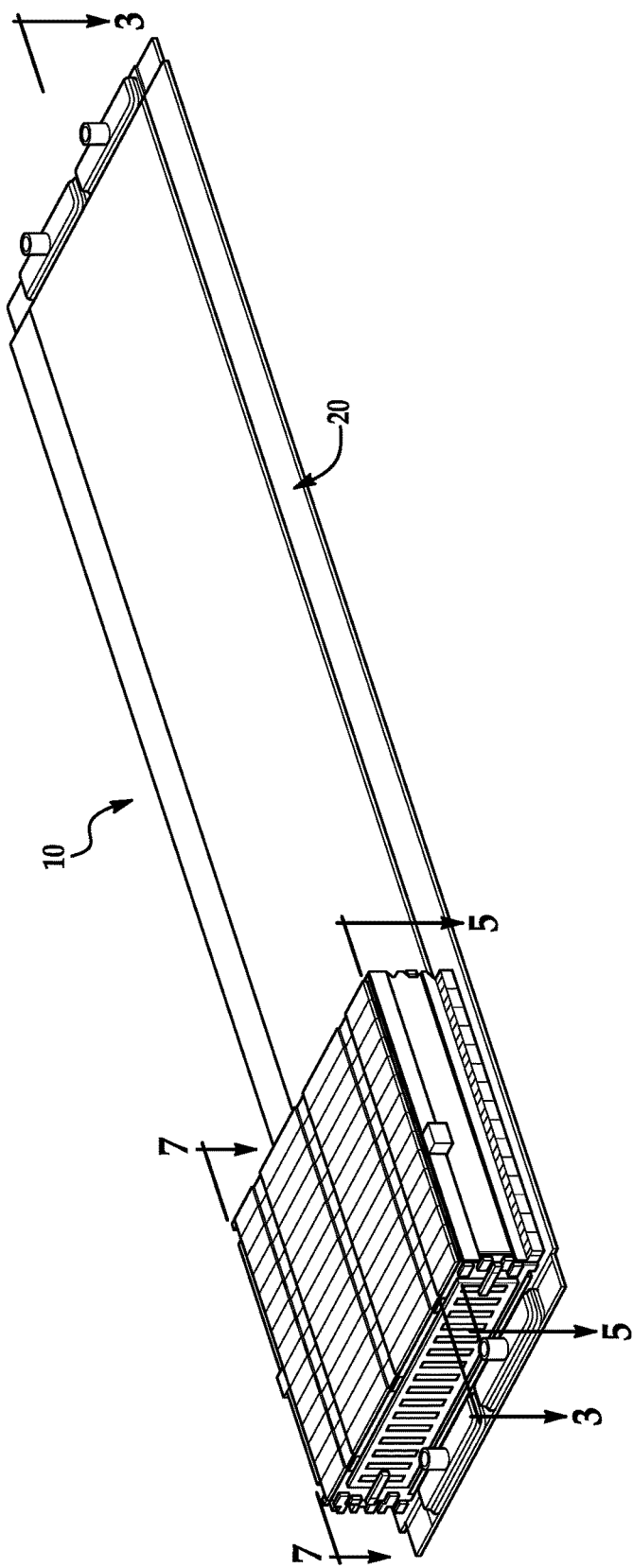
FIG. 1 is a schematic of a battery system in accordance with an exemplary embodiment.

Referring to FIGS. 1, 8, 9, 12 and 14, a battery system 10 in accordance with an exemplary embodiment is provided.

The battery system 10 includes a thermally conductive base member 20, a thermal transfer member 22, thermally conductive adhesive portions 30, 32, 34, 36, 38, 40, 42, 44, 46, 48, 50, 52, 54, 56, 58, 60, 62, 64, 66, 68, 70, 72, 74, 76, 78, 80, 82, 84, 86, 88 and a battery module 120. An advantage of the battery system 10 is that the battery system 10 utilizes the thermally conductive adhesive portions 30-88 on the thermal transfer member 22 wherein the thermally conductive adhesive portions 30-88 are disposed directly against end portions of pouch-type battery cells of the battery module 120, and the thermal transfer member 22 transfers heat energy from the pouch-type battery cells to the thermally conductive base member 20, without having to use cooling fins disposed between the pouch-type battery cells.

Figure 2:
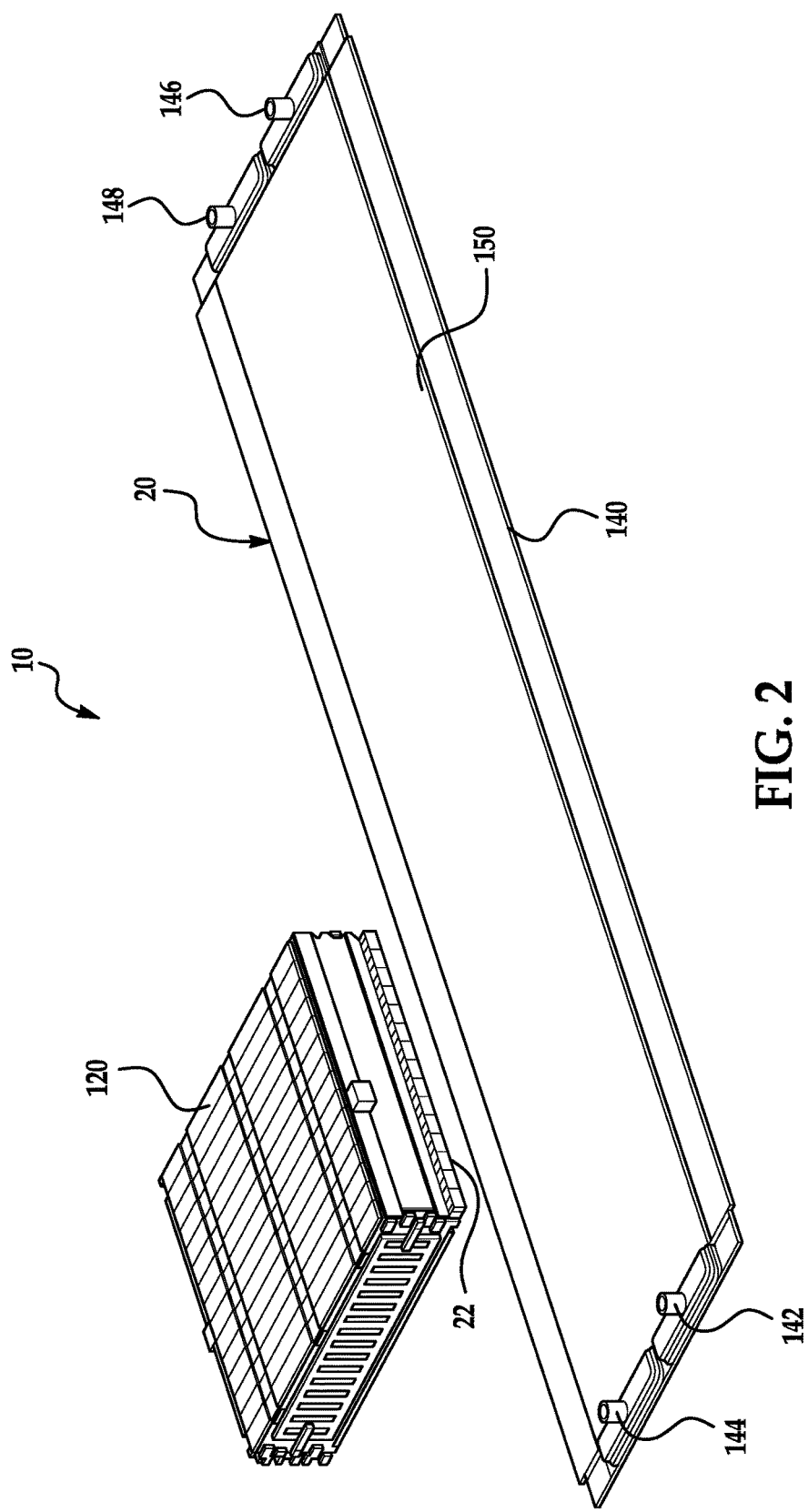
FIG. 2 is an exploded view of the battery system of FIG. 1.
Figure 16:
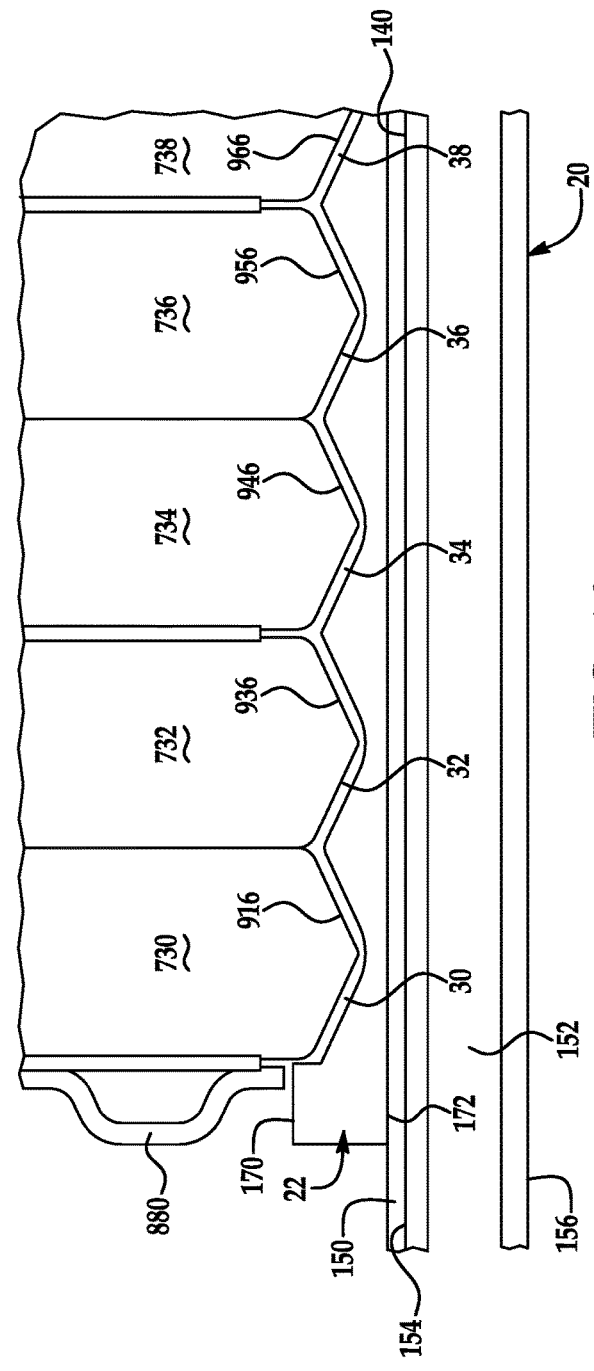
FIG. 16 is an enlarged cross-sectional schematic of a portion of the battery system of FIG. 4.
Figure 15:
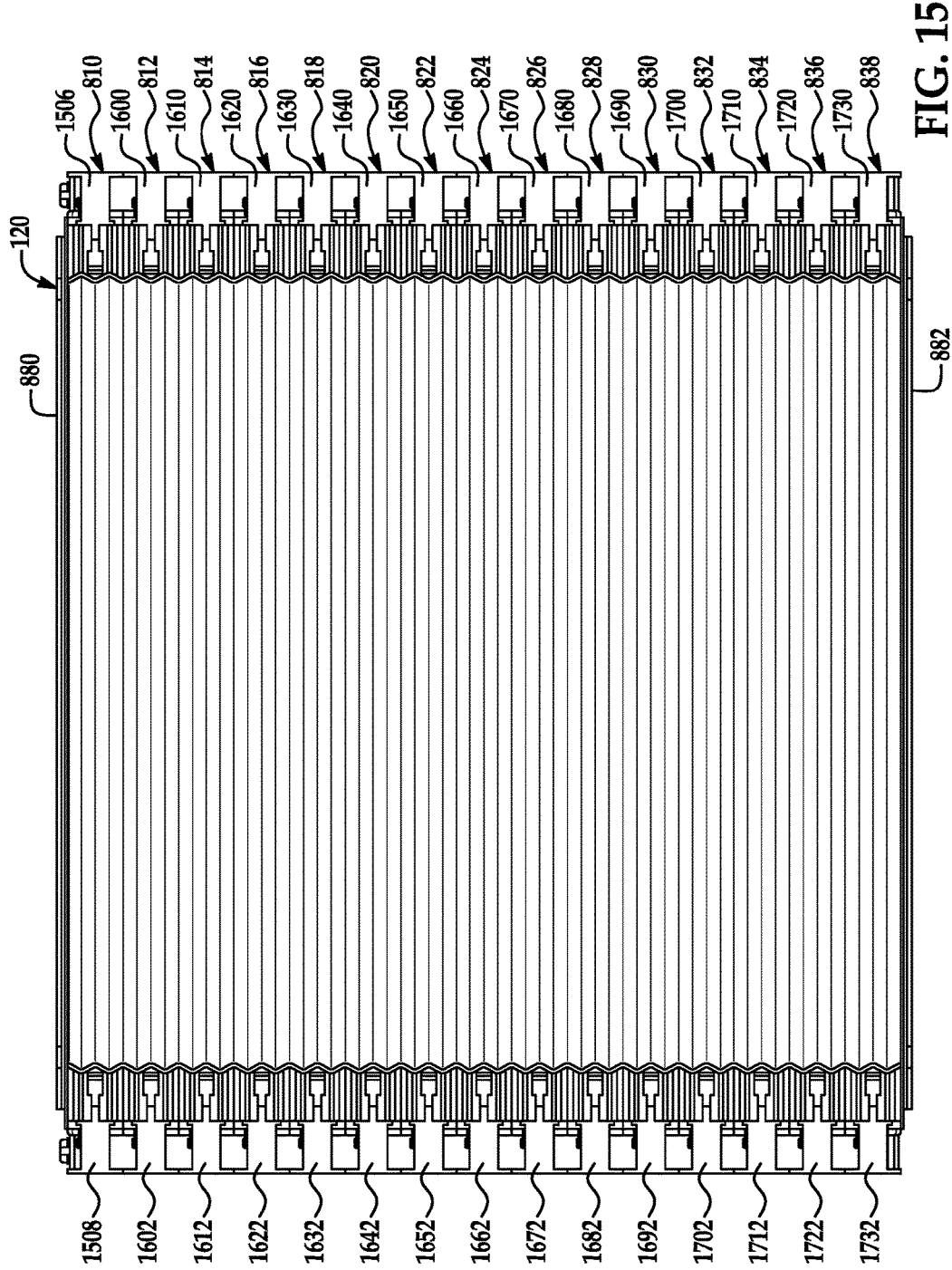
FIG. 15 is a bottom view of the battery module of FIG. 10.
Figure 17:
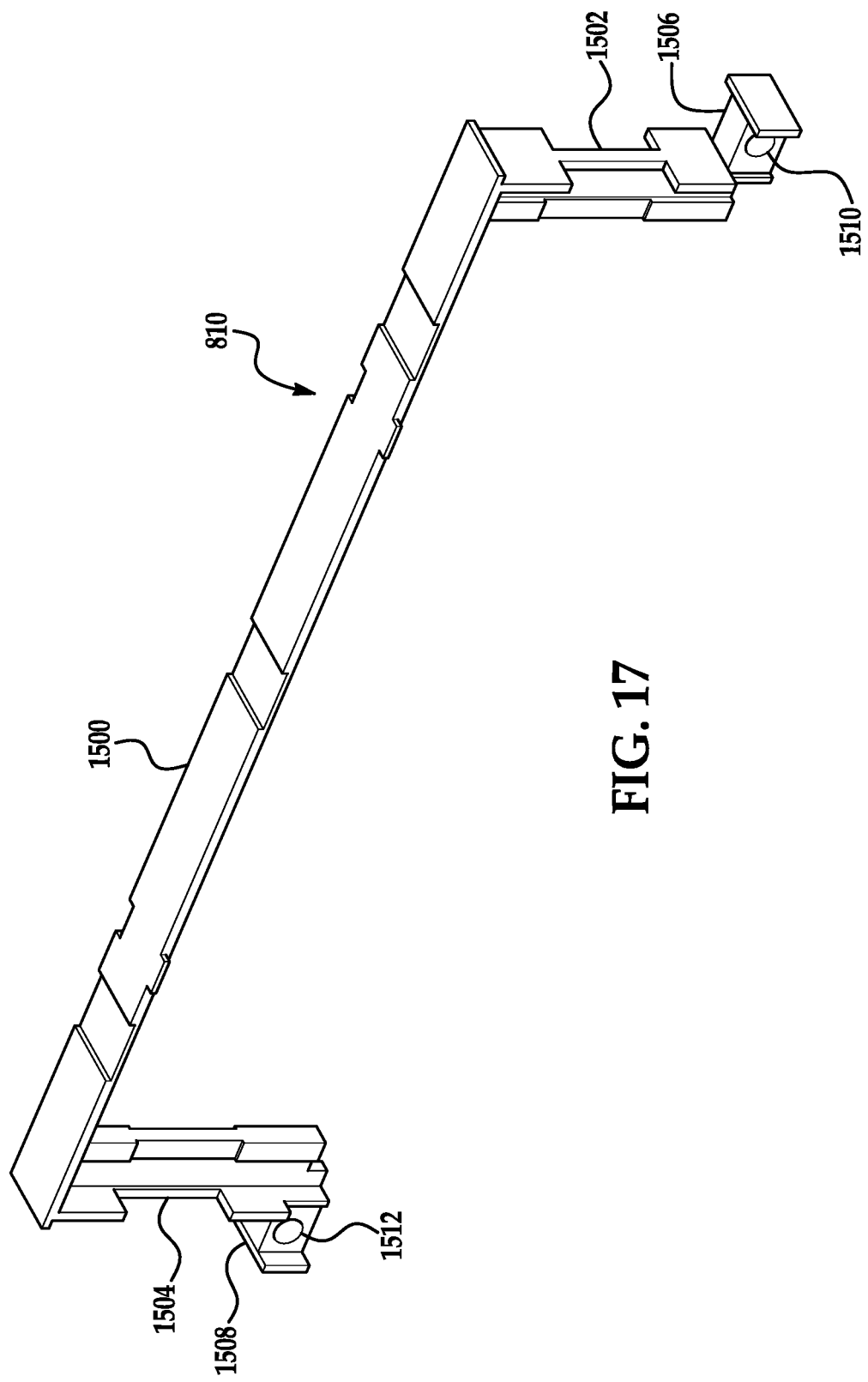
FIG. 17 is schematic of a plastic frame member utilized in the battery module of FIG. 4.

Referring to FIGS. 2, 4, and 16, the thermally conductive base member 20 is provided to conduct heat energy from the thermal transfer member 22 to a fluid flowing through the thermally conductive base member 20. The thermally conductive base member 20 includes an outer housing 140, inlet ports 142, 144, outlet ports 146, 148, and a thermally conductive base layer 150.

The outer housing 140 has a top surface 154 and a bottom surface 156. The thermally conductive base layer 150 is disposed on and coupled to the top surface 154. The outer housing 140 further includes an enclosed interior region 152 therein. The inlet ports 142, 144 are coupled to the outer housing 140 proximate to a first end thereof and fluidly communicate with the enclosed interior region 152. The outlet ports 146, 148 are coupled to the outer housing 140 proximate to a second end thereof and fluidly communicate with the enclosed interior region 152. A fluid supply system (not shown) pumps fluid through the inlet ports 142, 144 and the enclosed interior region 152 and then through the outlet ports 146, 148 for extracting heat energy from the thermally conductive base member 20 and the thermal transfer member 22. In an exemplary embodiment, the outer housing 140, the inlet ports 142, 144, the outlet ports 146, 148 are constructed of metal. Of course, in an alternative embodiment, the outer housing 140, the inlet ports 142, 144, the outlet ports 146, 148 could be constructed of other thermally conductive materials. In an alternative embodiment, the thermally conductive base layer 150 could be omitted from the thermally conductive base member 20.

Figure 10:
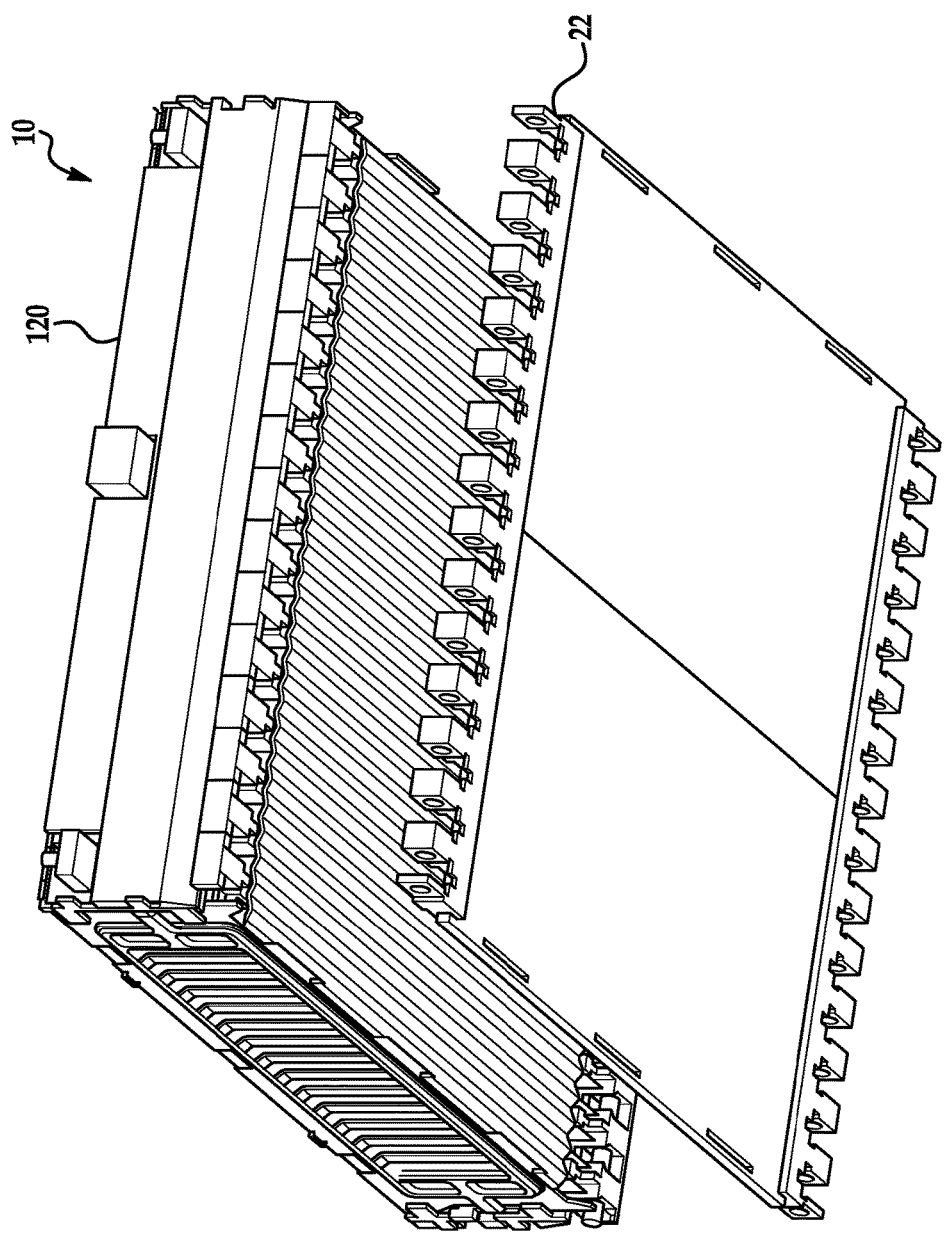
FIG. 10 is another exploded schematic of the battery module and thermal transfer member of FIG. 8.
Figure 11:
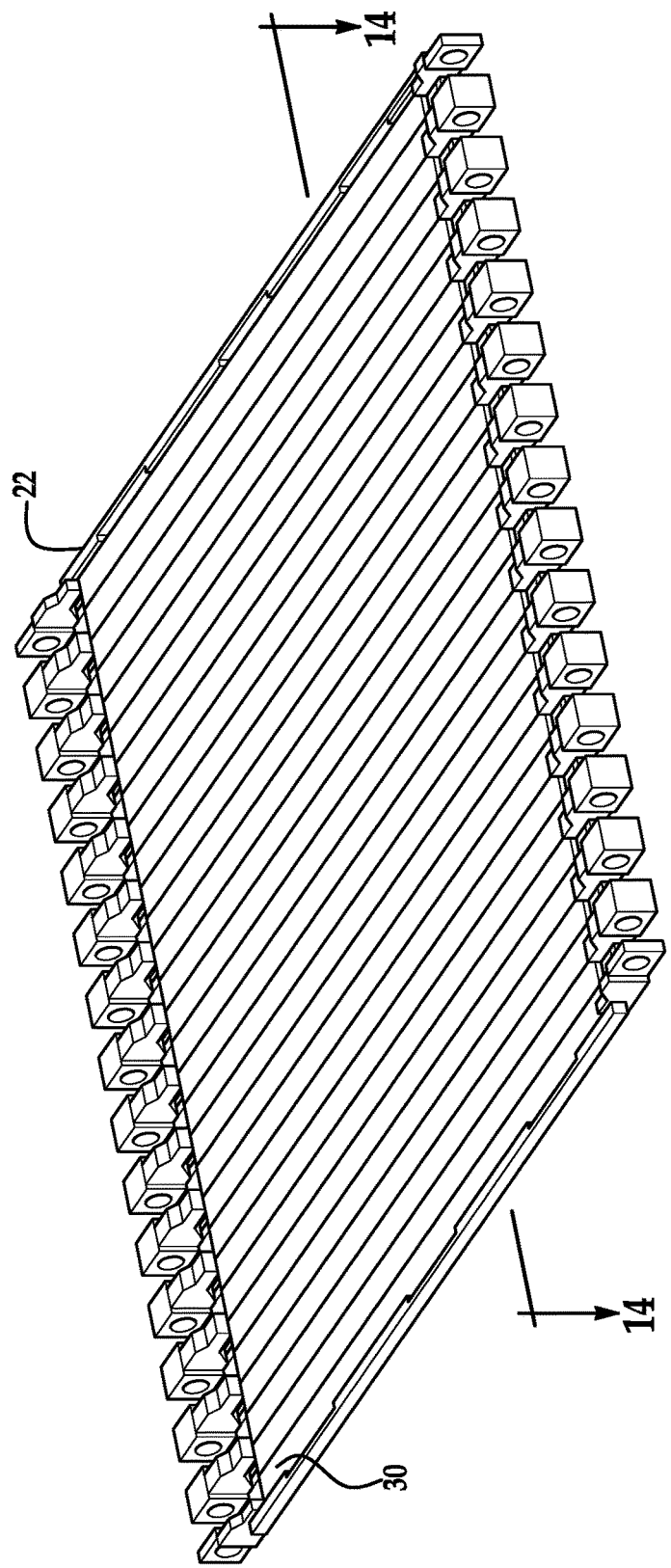
FIG. 11 is a schematic of the thermal transfer member of FIG. 10 having a plurality of thermally conductive adhesive portions thereon.
Figure 12:
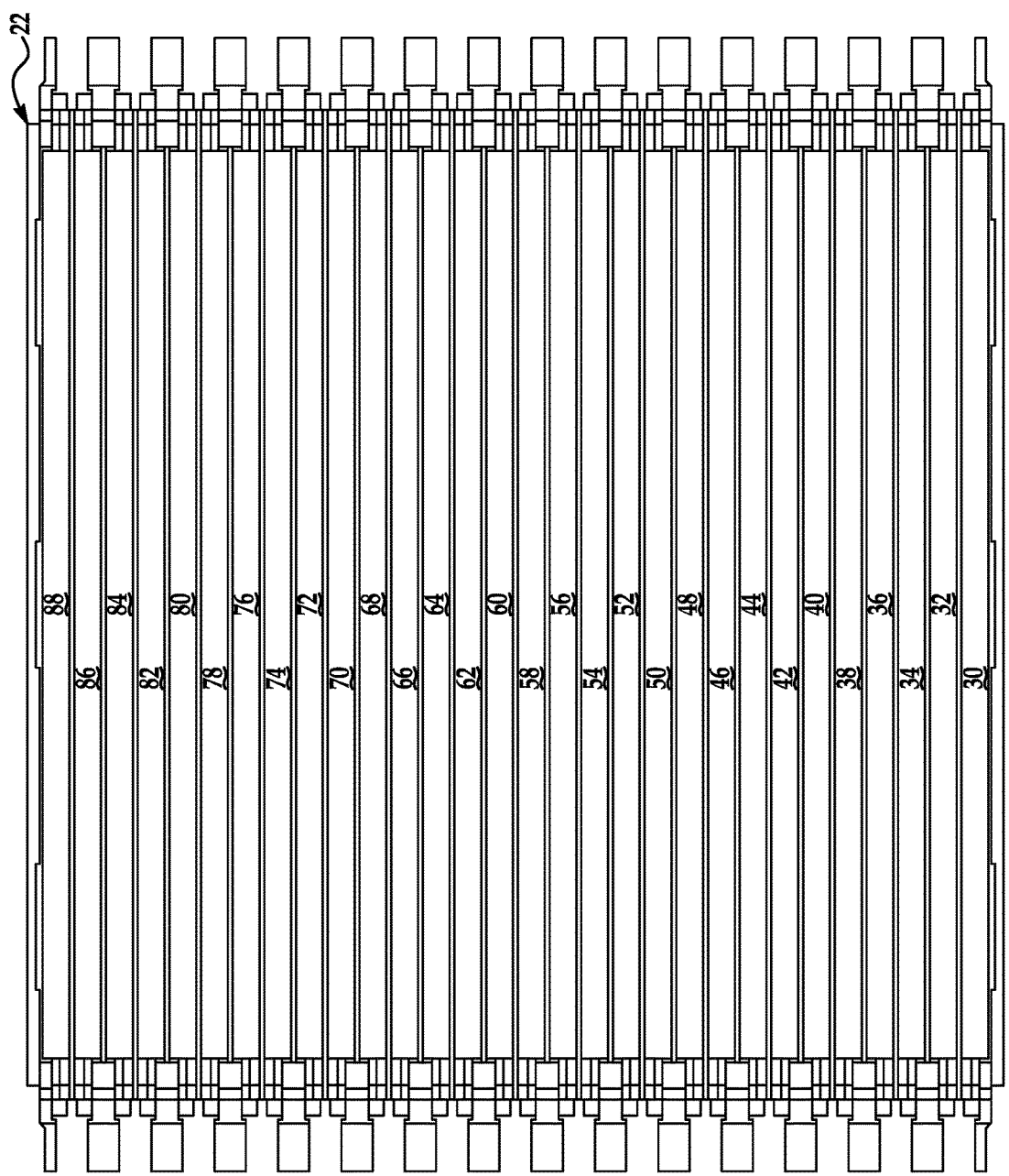
FIG. 12 is a top view of the thermal transfer member and the plurality of thermally conductive adhesive portions of FIG. 11.

Referring to FIGS. 12, 13, 14 and 16, the thermal transfer member 22 is disposed on and coupled to the thermally conductive base member 20. The thermal transfer member 22 has a metal plate 160 and plastic coupling members 162, 164. The metal plate 160 has a top portion 170 (shown in FIG. 10) and a bottom portion 172. The bottom portion 172 is disposed on and coupled to the thermally conductive base layer 150 of the thermally conductive base member 20. The top portion 170 has the substantially arcuate-shaped grooves 230, 232, 234, 236, 238, 240, 242, 244, 246, 248, 250, 252, 254, 256, 258, 260, 262, 264, 266, 268, 270, 272, 274, 276, 278, 280, 282, 284, 286, 288 (shown in FIG. 14) extending inwardly into the metal plate 160. The substantially arcuate-shaped grooves 230-288 extend substantially parallel to one another across an entire width of the metal plate 160. A width of each of the substantially arcuate-shaped grooves 230-288 is substantially equal to a width of an end portion of an outer housing of a respective pouch-type battery cell in the battery module 120 that is disposed above a respective arcuate-shaped groove. Further, a depth of each of the substantially arcuate-shaped grooves 230-288 is substantially equal to a height of an end portion of an outer housing of a respective pouch-type battery cell in the battery module 120 that is disposed above a respective arcuate-shaped groove. In an exemplary embodiment, the metal plate 160 is an extruded aluminum plate. Of course, in an alternative embodiment, the metal plate 160 could be constructed of other thermally conductive materials such as steel for example.

Figure 13:
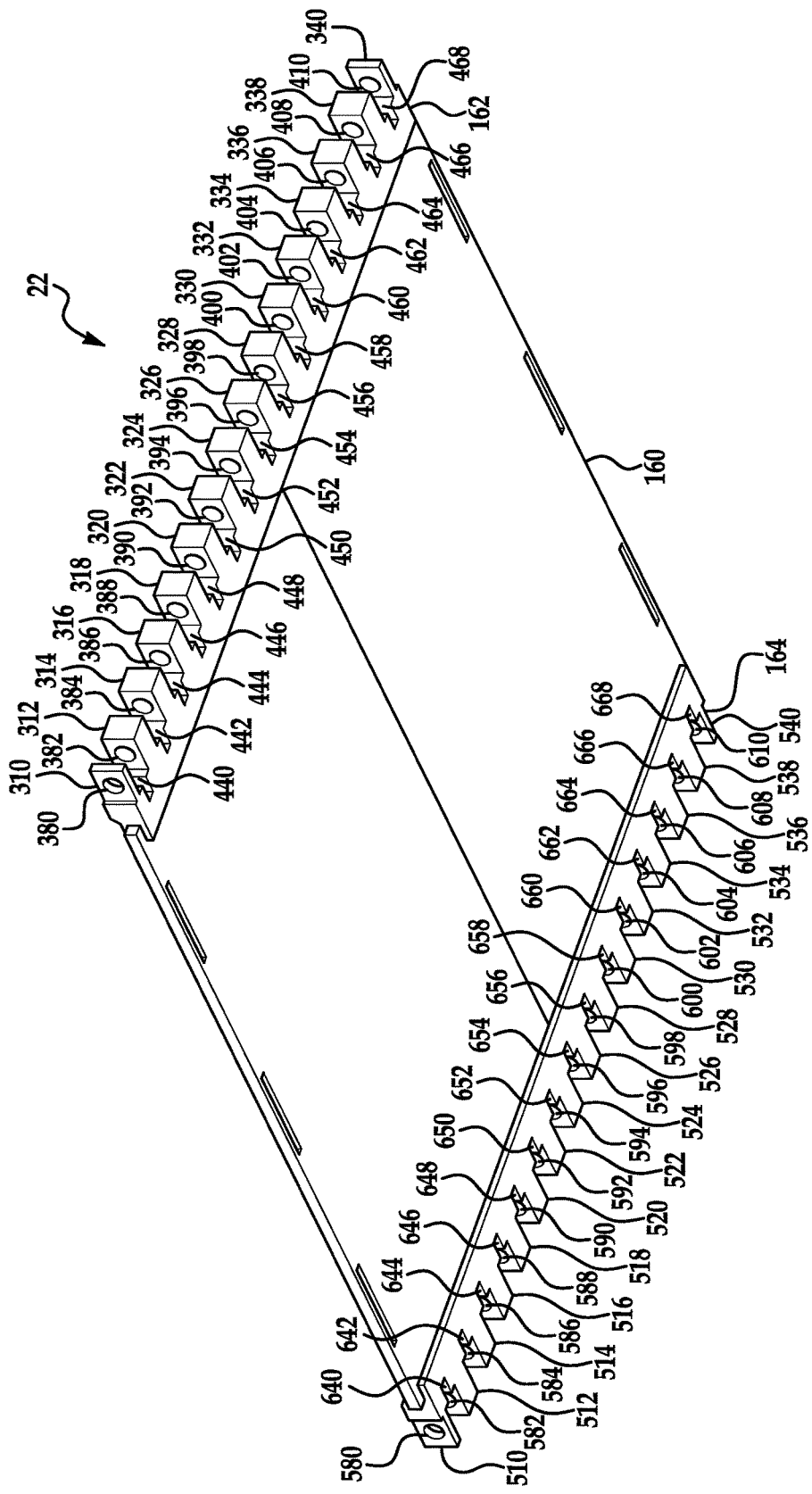
FIG. 13 is a bottom view of the thermal transfer member of FIG. 11.

Referring to FIG. 13, the plastic coupling member 162 is disposed on and coupled to a first end of the metal plate 160. The plastic coupling member 162 includes plastic coupling tabs 310, 312, 314, 316, 318, 320, 322, 324, 326, 328, 330, 332, 334, 336, 338, 340 extending outwardly from the first end of the metal plate 160 and are disposed apart from one another. The plastic coupling tabs 310, 312, 314, 316, 318, 320, 322, 324, 326, 328, 330, 332, 334, 336, 338, 340 have apertures, 380, 382, 384, 386, 388, 390, 392, 394, 396, 398, 400, 402, 404, 406, 408, 410, respectively, extending therethrough. The plastic coupling tabs 310, 312 have a gap 440 therebetween, and the plastic coupling tabs 312, 314 have a gap 442 therebetween. The plastic coupling tabs 314, 316 have a gap 444 therebetween, and the plastic coupling tabs 316, 318 have a gap 446 therebetween. The plastic coupling tabs 318, 320 have a gap 448 therebetween, and the plastic coupling tabs 320, 322 have a gap 450 therebetween. The plastic coupling tabs 322, 324 have a gap 452 therebetween, and the plastic coupling tabs 324, 326 have a gap 454 therebetween. The plastic coupling tabs 326, 328 have a gap 456 therebetween, and the plastic coupling tabs 328, 330 have a gap 458 therebetween. The plastic coupling tabs 330, 332 have a gap 460 therebetween, and the plastic coupling tabs 332, 334 have a gap 462 therebetween. The plastic coupling tabs 334, 336 have a gap 464 therebetween, and the plastic coupling tabs 336, 338 have a gap 466 therebetween. The plastic coupling tabs 338, 340 have a gap 468 therebetween.

The plastic coupling member 164 is disposed on and coupled to a second end of the metal plate 160. The plastic coupling member 164 includes plastic coupling tabs 510, 512, 514, 516, 518, 520, 522, 524, 526, 528, 530, 532, 534, 536, 538, 540 extending outwardly from the second end of the metal plate 160 and are disposed apart from one another. The plastic coupling tabs 510, 512, 514, 516, 518, 520, 522, 524, 526, 528, 530, 532, 534, 536, 538, 540 have apertures, 580, 582, 584, 586, 588, 590, 592, 594, 596, 598, 600, 602, 604, 606, 608, 610, respectively, extending therethrough. The plastic coupling tabs 510, 512 have a gap 640 therebetween, and the plastic coupling tabs 512, 514 have a gap 642 therebetween. The plastic coupling tabs 514, 516 have a gap 644 therebetween, and the plastic coupling tabs 516, 518 have a gap 646 therebetween. The plastic coupling tabs 518, 520 have a gap 648 therebetween, and the plastic coupling tabs 520, 522 have a gap 650 therebetween. The plastic coupling tabs 522, 524 have a gap 652 therebetween, and the plastic coupling tabs 524, 526 have a gap 654 therebetween. The plastic coupling tabs 526, 528 have a gap 656 therebetween, and the plastic coupling tabs 528, 530 have a gap 658 therebetween. The plastic coupling tabs 530, 532 have a gap 660 therebetween, and the plastic coupling tabs 532, 534 have a gap 662 therebetween. The plastic coupling tabs 534, 536 have a gap 664 therebetween, and the plastic coupling tabs 536, 538 have a gap 666 therebetween. The plastic coupling tabs 538, 540 have a gap 668 therebetween.

Figure 14:
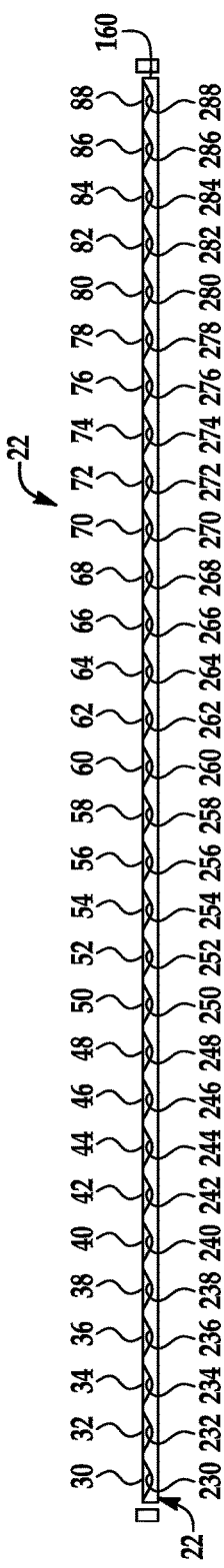
FIG. 14 is a cross-sectional view of the thermal transfer member and the plurality of thermally conductive adhesive portions of FIG. 11 taken along lines 14-14 in FIG. 11.

Referring to FIGS. 4 and 14, the thermally conductive adhesive portions 30, 32, 34, 36, 38, 40, 42, 44, 46, 48, 50, 52, 54, 56, 58, 60, 62, 64, 66, 68, 70, 72, 74, 76, 78, 80, 82, 84, 86, 88 are provided to couple first end portions of the pouch-type battery cells of the battery module 120 to the metal plate 160 of the thermal transfer member 22. In an exemplary embodiment, each of the thermally conductive adhesive portions 30-88 are a silicon-based thermally conductive adhesive. In an alternative embodiment, each of the thermally conductive adhesive portions 30-88 are an epoxy-based thermally conductive adhesive. Further, each of the thermally conductive adhesive portions 30-88 have a thermal conductivity in a range of 1.0-4.0 Watts per meter-Kelvin. The thermally conductive adhesive portions 30, 32, 34, 36, 38, 40, 42, 44, 46, 48, 50, 52, 54, 56, 58, 60, 62, 64, 66, 68, 70, 72, 74, 76, 78, 80, 82, 84, 86, 88 are disposed in the substantially arcuate-shaped grooves 230, 232, 234, 236, 238, 240, 242, 244, 246, 248, 250, 252, 254, 256, 258, 260, 262, 264, 266, 268, 270, 272, 274, 276, 278, 280, 282, 284, 286, 288, respectively, in the metal plate 160 of the thermal transfer member 22, and coupled to the metal plate 160.

Figure 5:
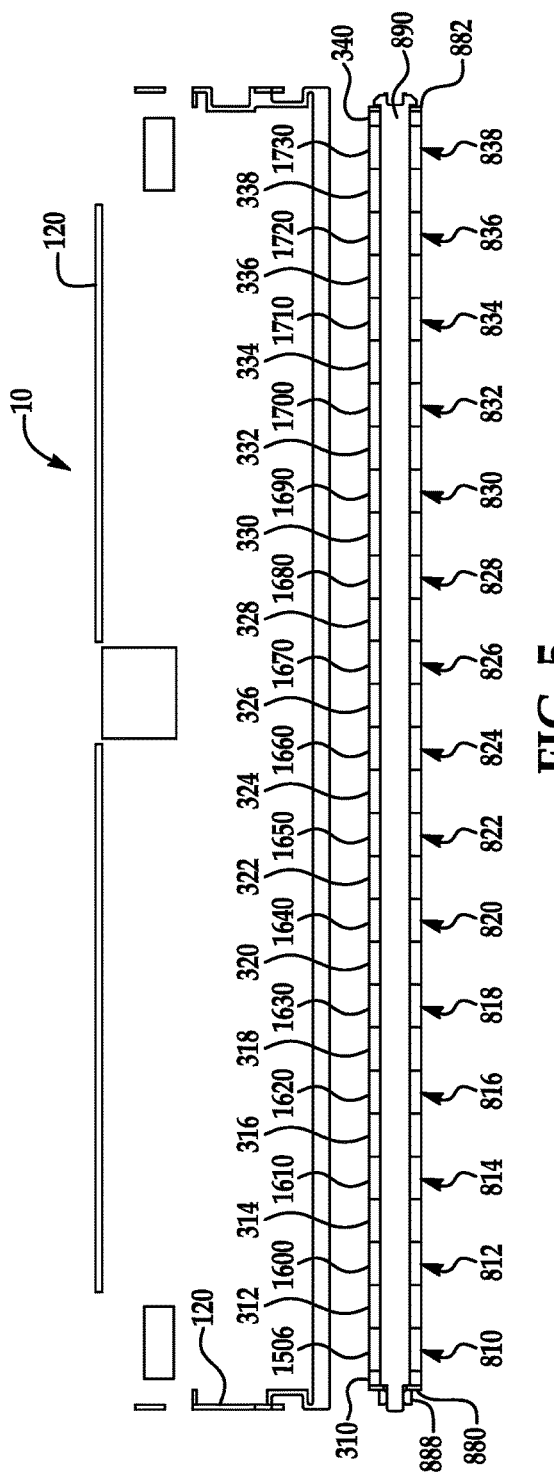
FIG. 5 is another cross-sectional view of the battery system of FIG. 1 taken along lines 5-5 of FIG. 1 with a thermally conductive base member not shown.
Figure 6:
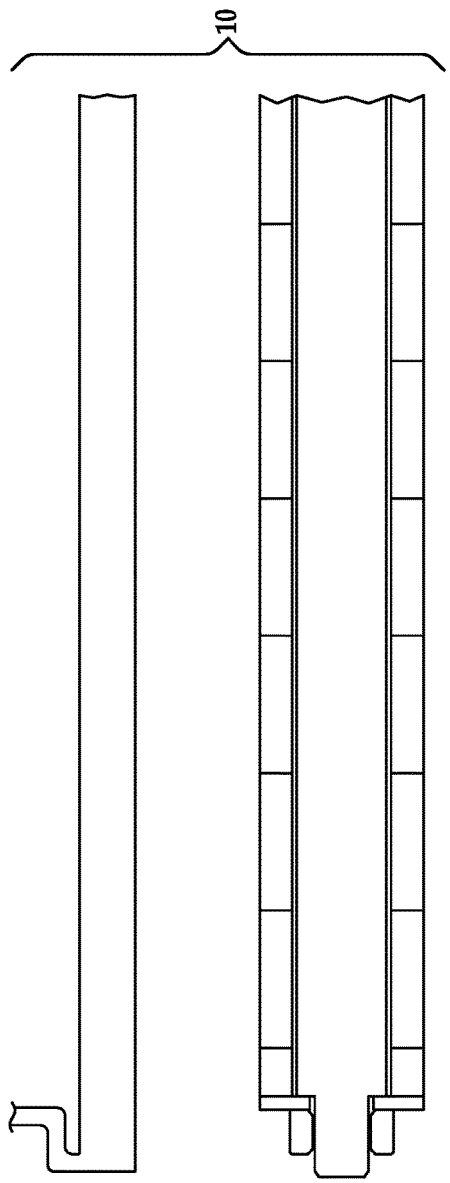
FIG. 6 is an enlarged portion of the cross-sectional view of the battery system shown in FIG. 5.
Figure 7:
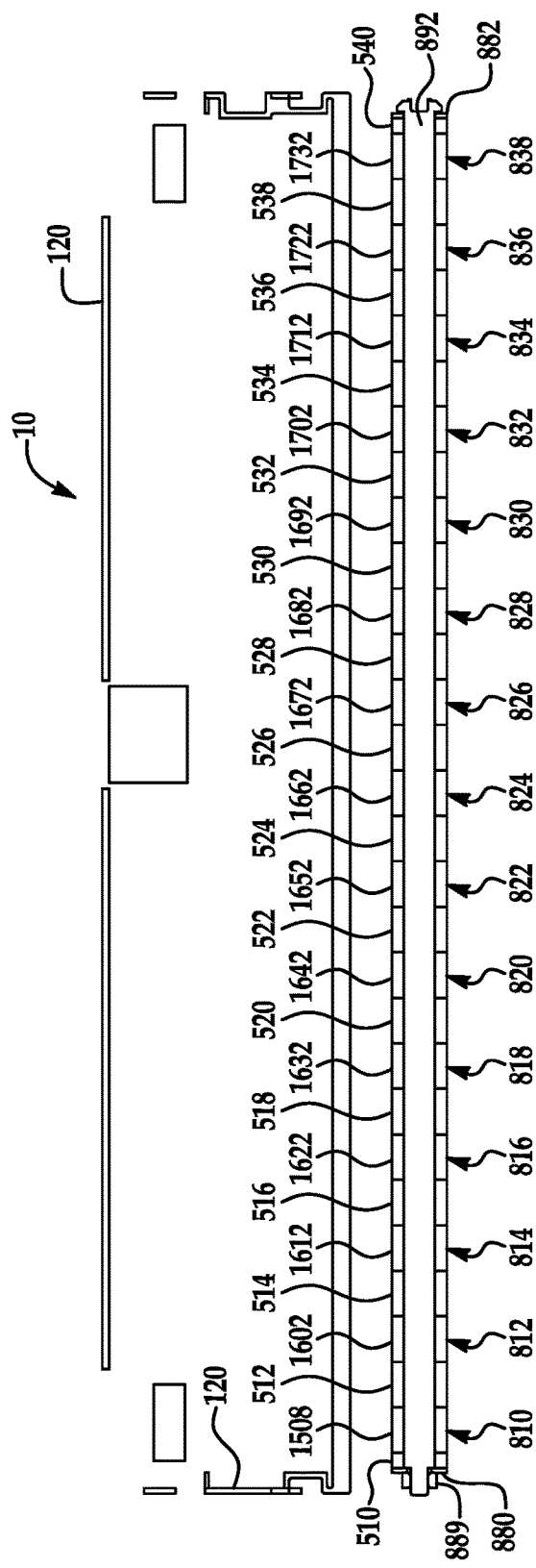
FIG. 7 is a cross-sectional view of the battery system of FIG. 1 taken along lines 7-7 of FIG. 1 with a thermally conductive base member not shown.
Figure 8:
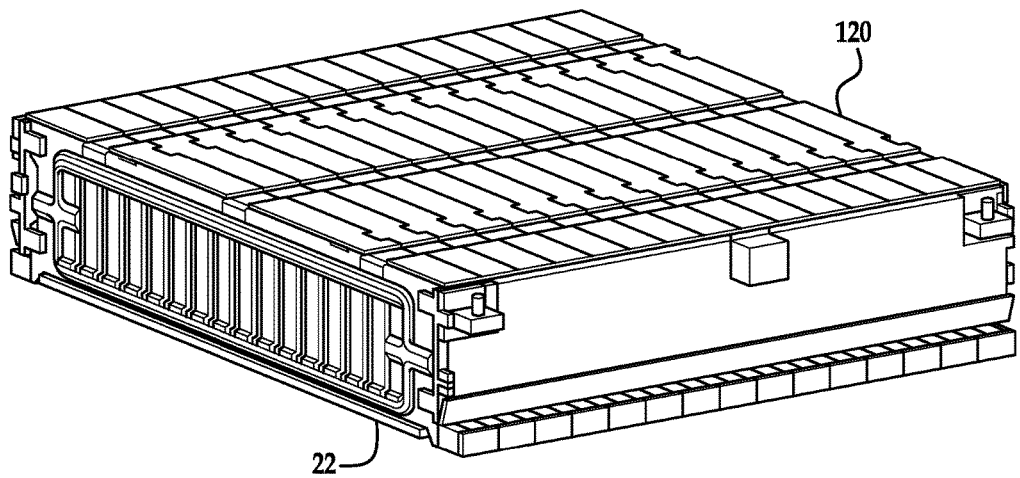
FIG. 8 is a schematic of a battery module and a thermal transfer member utilized in the battery system of FIG. 1.
Figure 9:
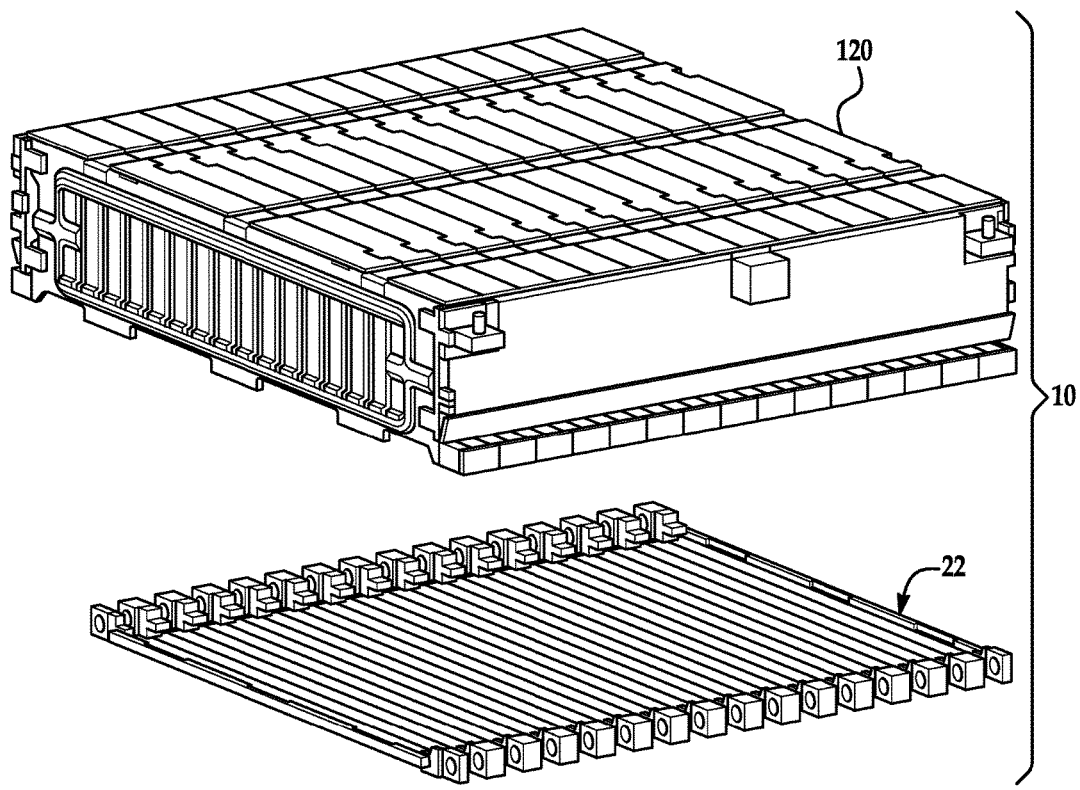
FIG. 9 is an exploded schematic of the battery module and the thermal transfer member of FIG. 8.

Referring to FIGS. 4, 5 and 7, the battery module 120 includes pouch-type battery cells 730, 732, 734, 736, 738, 740, 742, 744, 746, 748, 750, 752, 754, 756, 758, 760, 762, 764, 766, 768, 770, 772, 774, 776, 778, 780, 72, 784, 786, 788, plastic frame members 810, 812, 814, 816, 818, 820, 822, 824, 826, 828, 830, 832, 834, 836, 838, end plates 880, 882, nuts 888, 889 (shown in FIGS. 5 and 7), shoulder bolts 890, 892, and foam members 893, 894, 895, 896, 897, 898, 899, 900, 901, 902, 903, 904, 905, 906, 907, 908. In an exemplary embodiment, the pouch-type battery cells 730-788 are each lithium-ion pouch-type battery cells and have identical structure to one another. Further, the foam member 893-908 are open-cell foam members.

Figure 20:
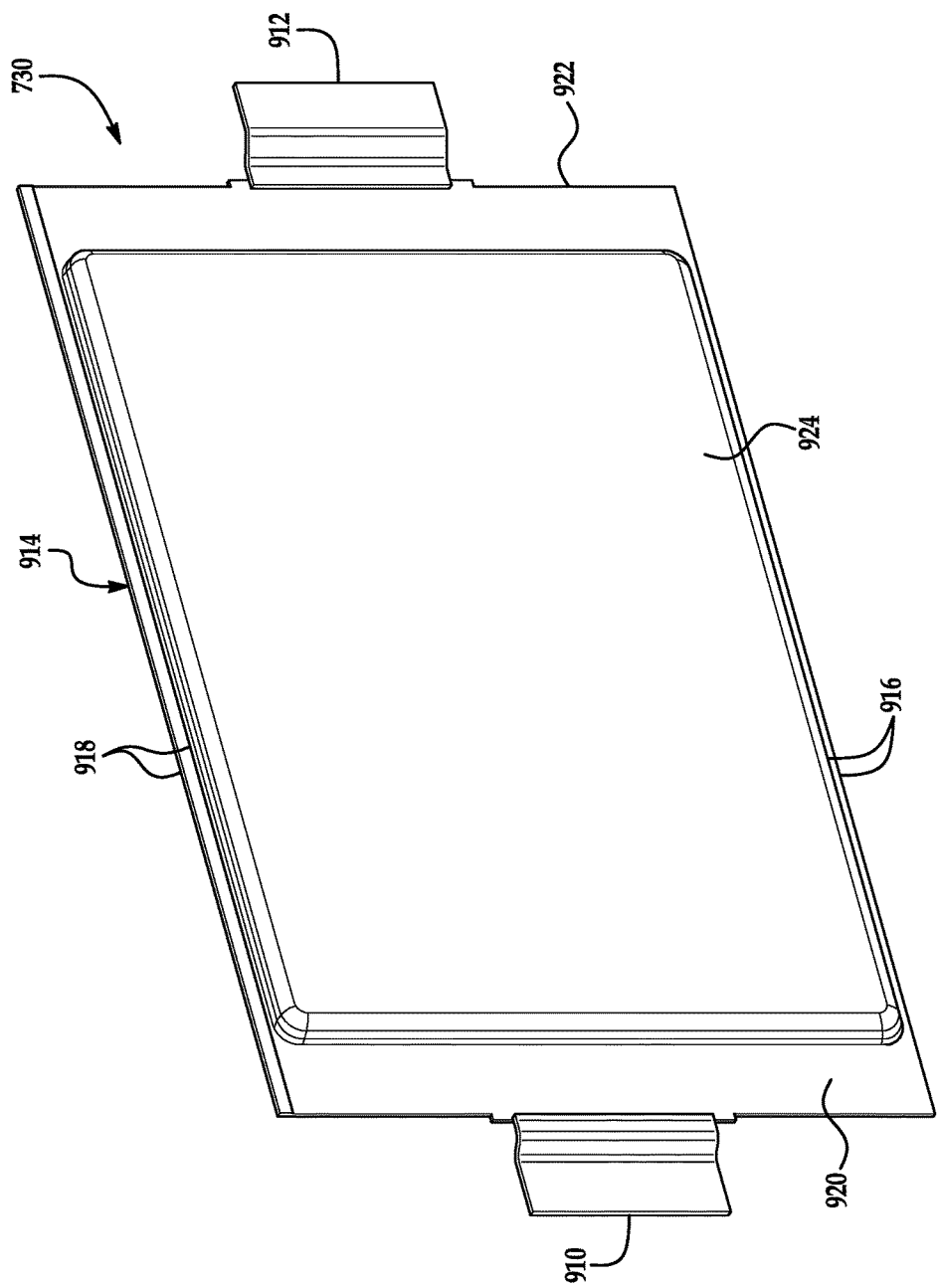
FIG. 20 is a schematic of a pouch-type battery cell utilized in the battery module of FIG. 4.
Figure 21:
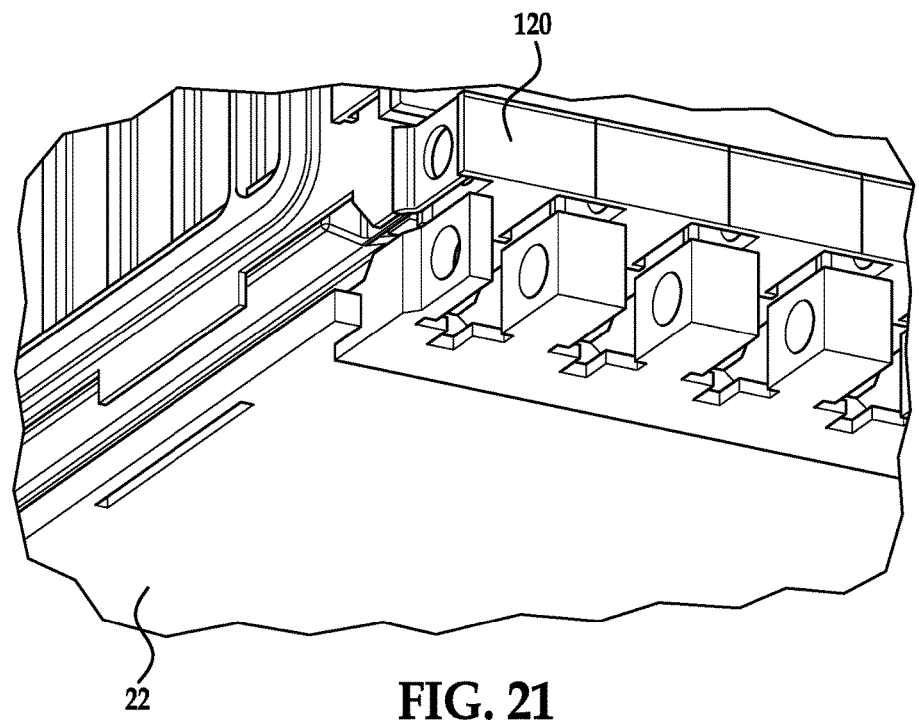
FIG. 21 is a schematic of the thermal transfer member prior to being coupled to the battery module of FIG. 10.
Figure 22:
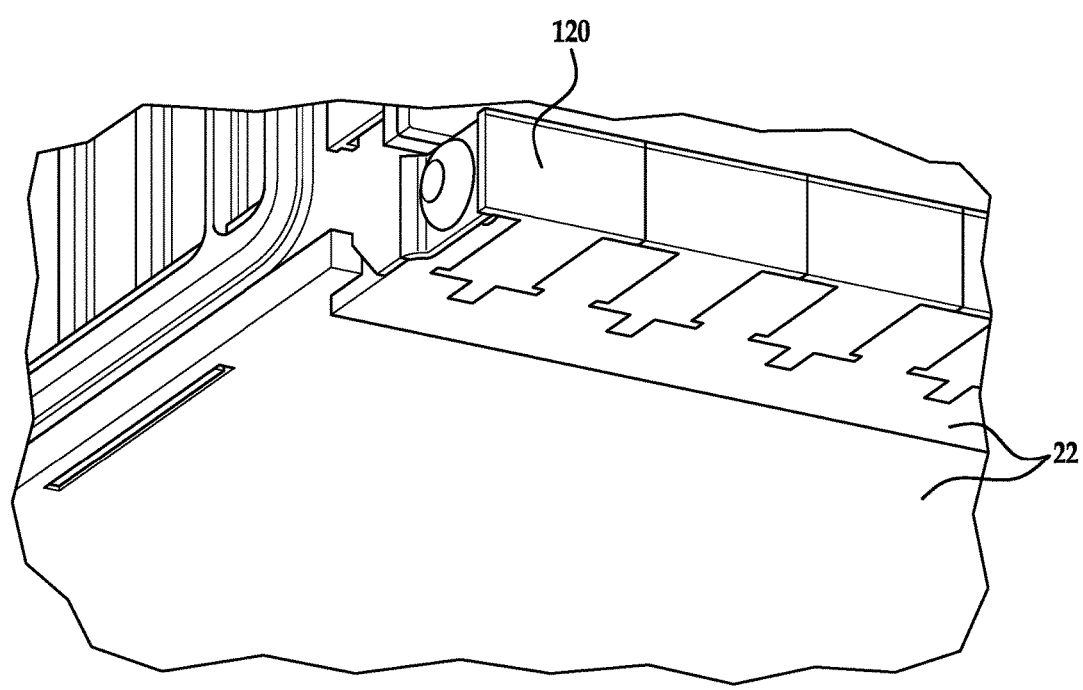
FIG. 22 is a schematic of the thermal transfer member being coupled to the battery module of FIG. 10.
Figure 23:
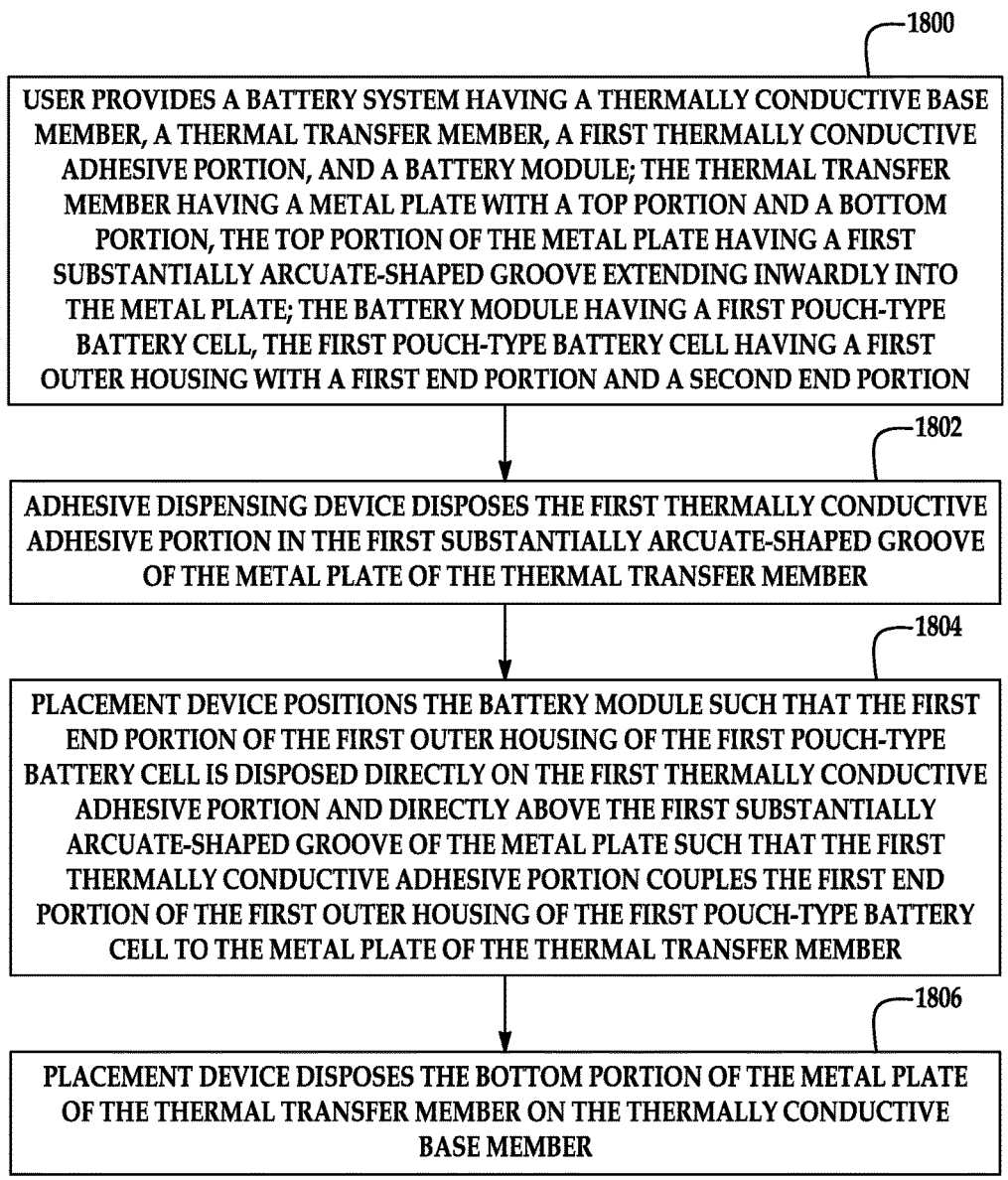
FIG. 23 is a flowchart of a method for assembling the battery system of FIG. 1 in accordance with another exemplary embodiment.
Figure 24:
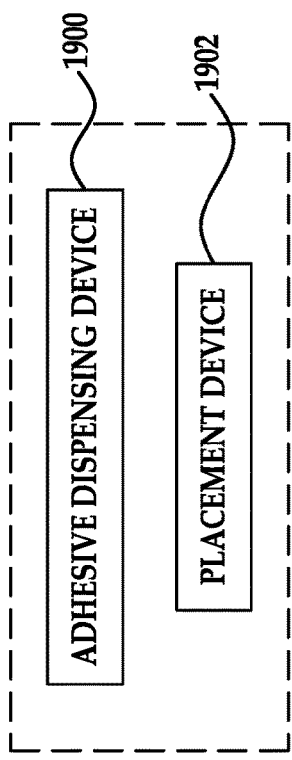
FIG. 24 is a block diagram of an adhesive dispensing device and a placement device utilized for assembling the battery system of FIG. 1.

Referring to FIGS. 4 and 20, the pouch-type battery cell 730 includes electrical terminals 910, 912 and an outer housing 914. The outer housing 914 includes a first end portion 916, a second end portion 918, a third end portion 920, and a fourth end portion 922, and major surfaces 924, 926. The first and second end portions 916, 918 extend substantially parallel to one another. The third and fourth end portions 920, 922 extend substantially parallel to one another, and substantially perpendicular to the first and second end portions 916, 918. The major surface 924 is disposed between the first end portion 916, the second end portion 918, the third end portion 920, and the fourth end portion 922. Further, the major surface 926 extends substantially parallel to the major surface 924 and is disposed between the first end portion 916, the second end portion 918, the third end portion 920, and the fourth end portion 922. The electrical terminal 910 extends outwardly from the third end portion 920, and the electrical terminal 912 extends outwardly for the fourth end portion 922. A length of the first end portion 461 is in a range of 1.0-5.0 millimeters. Further, a length of the second end portion 918 is greater than a length of the first end portion 916.

Referring to FIGS. 4, 14, 16 and 20, the first end portion 916 of the outer housing 914 of the pouch-type battery cell 730 is disposed directly on the thermally conductive adhesive portion 30 and is disposed directly above the substantially arcuate-shaped groove 230 of the metal plate 160 such that the thermally conductive adhesive portion 30 fixedly couples the first end portion 916 of the outer housing 914 of the pouch-type battery cell 730 to the metal plate 160. The foam member 893 is disposed between the end plate 880 and the battery cell 730. The pouch-type battery cell 730 is disposed between the foam member 893 and the pouch-type battery cell 732.

Referring to FIGS. 4 and 14, the pouch-type battery cell 732 includes a pair of electrical terminals (not shown) and an outer housing 932. The outer housing 932 includes a first end portion 936 and a second end portion 938. The first end portion 936 is disposed directly on the thermally conductive adhesive portion 32 and is disposed directly above the substantially arcuate-shaped groove 232 of the metal plate 160 such that the thermally conductive adhesive portion 32 fixedly couples the first end portion 936 of the outer housing 932 of the pouch-type battery cell 732 to the metal plate 160. The pouch-type battery cell 732 is disposed between the pouch-type battery cell 730 and the foam member 894. The foam member 894 is disposed between the pouch-type battery cells 732, 734.

The pouch-type battery cell 734 includes a pair of electrical terminals (not shown) and an outer housing 944. The outer housing 944 includes a first end portion 946 and a second end portion 948. The first end portion 946 is disposed directly on the thermally conductive adhesive portion 34 and is disposed directly above the substantially arcuate-shaped groove 234 of the metal plate 160 such that the thermally conductive adhesive portion 34 fixedly couples the first end portion 946 of the outer housing 944 of the pouch-type battery cell 734 to the metal plate 160. The pouch-type battery cell 734 is disposed between the foam layer 894 and the pouch-type battery cell 736.

The pouch-type battery cell 736 includes a pair of electrical terminals (not shown) and an outer housing 954. The outer housing 954 includes a first end portion 956 and a second end portion 958. The first end portion 956 is disposed directly on the thermally conductive adhesive portion 36 and is disposed directly above the substantially arcuate-shaped groove 236 of the metal plate 160 such that the thermally conductive adhesive portion 36 fixedly couples the first end portion 956 of the outer housing 954 of the pouch-type battery cell 736 to the metal plate 160. The pouch-type battery cell 736 is disposed between the pouch-type battery cell 734 and the foam member 895. The foam member 895 is disposed between the pouch-type battery cells 736, 738.

The pouch-type battery cell 738 includes a pair of electrical terminals (not shown) and an outer housing 964. The outer housing 964 includes a first end portion 966 and a second end portion 968. The first end portion 966 is disposed directly on the thermally conductive adhesive portion 38 and is disposed directly above the substantially arcuate-shaped groove 238 of the metal plate 160 such that the thermally conductive adhesive portion 38 fixedly couples the first end portion 966 of the outer housing 964 of the pouch-type battery cell 738 to the metal plate 160. The pouch-type battery cell 738 is disposed between the foam member 895 and the pouch-type battery cell 740.

The pouch-type battery cell 740 includes a pair of electrical terminals (not shown) and an outer housing 974. The outer housing 974 includes a first end portion 976 and a second end portion 978. The first end portion 976 is disposed directly on the thermally conductive adhesive portion 40 and is disposed directly above the substantially arcuate-shaped groove 240 of the metal plate 160 such that the thermally conductive adhesive portion 40 fixedly couples the first end portion 976 of the outer housing 974 of the pouch-type battery cell 740 to the metal plate 160. The pouch-type battery cell 740 is disposed between the pouch-type battery cell 738 and the foam member 896. The foam member 896 is disposed between the pouch-type battery cells 740, 742.

The pouch-type battery cell 742 includes a pair of electrical terminals (not shown) and an outer housing 984. The outer housing 984 includes a first end portion 986 and a second end portion 988. The first end portion 986 is disposed directly on the thermally conductive adhesive portion 42 and is disposed directly above the substantially arcuate-shaped groove 242 of the metal plate 160 such that the thermally conductive adhesive portion 42 fixedly couples the first end portion 986 of the outer housing 984 of the pouch-type battery cell 742 to the metal plate 160. The pouch-type battery cell 742 is disposed between the foam layer 896 and the pouch-type battery cell 744.

The pouch-type battery cell 744 includes a pair of electrical terminals (not shown) and an outer housing 994. The outer housing 994 includes a first end portion 996 and a second end portion 998. The first end portion 996 is disposed directly on the thermally conductive adhesive portion 44 and is disposed directly above the substantially arcuate-shaped groove 244 of the metal plate 160 such that the thermally conductive adhesive portion 44 fixedly couples the first end portion 996 of the outer housing 994 of the pouch-type battery cell 744 to the metal plate 160. The pouch-type battery cell 744 is disposed between the pouch-type battery cell 742 and the foam layer 897. The foam layer 897 is disposed between the pouch-type battery cells 744, 746.

The pouch-type battery cell 746 includes a pair of electrical terminals (not shown) and an outer housing 1004. The outer housing 1004 includes a first end portion 1006 and a second end portion 1008. The first end portion 1006 is disposed directly on the thermally conductive adhesive portion 46 and is disposed directly above the substantially arcuate-shaped groove 246 of the metal plate 160 such that the thermally conductive adhesive portion 46 fixedly couples the first end portion 1006 of the outer housing 1004 of the pouch-type battery cell 746 to the metal plate 160. The pouch-type battery cell 746 is disposed between the foam layer 897 and the pouch-type battery cell 748.

The pouch-type battery cell 748 includes a pair of electrical terminals (not shown) and an outer housing 1014. The outer housing 1014 includes a first end portion 1016 and a second end portion 1018. The first end portion 1016 is disposed directly on the thermally conductive adhesive portion 48 and is disposed directly above the substantially arcuate-shaped groove 248 of the metal plate 160 such that the thermally conductive adhesive portion 48 fixedly couples the first end portion 1016 of the outer housing 1014 of the pouch-type battery cell 748 to the metal plate 160. The pouch-type battery cell 748 is disposed between the pouch-type battery cell 746 and the foam layer 898. The foam member 898 is disposed between the pouch-type battery cells 748, 750.

The pouch-type battery cell 750 includes a pair of electrical terminals (not shown) and an outer housing 1024. The outer housing 1024 includes a first end portion 1026 and a second end portion 1028. The first end portion 1026 is disposed directly on the thermally conductive adhesive portion 50 and is disposed directly above the substantially arcuate-shaped groove 250 of the metal plate 160 such that the thermally conductive adhesive portion 50 fixedly couples the first end portion 1026 of the outer housing 1024 of the pouch-type battery cell 750 to the metal plate 160. The pouch-type battery cell 750 is disposed between the foam layer 898 and the pouch-type battery cell 752.

The pouch-type battery cell 752 includes a pair of electrical terminals (not shown) and an outer housing 1034. The outer housing 1034 includes a first end portion 1036 and a second end portion 1038. The first end portion 1036 is disposed directly on the thermally conductive adhesive portion 52 and is disposed directly above the substantially arcuate-shaped groove 252 of the metal plate 160 such that the thermally conductive adhesive portion 52 fixedly couples the first end portion 1036 of the outer housing 1034 of the pouch-type battery cell 752 to the metal plate 160. The pouch-type battery cell 752 is disposed between the pouch-type battery cell 750 and the foam layer 899. The foam member 899 is disposed between the pouch-type battery cells 752, 754.

The pouch-type battery cell 754 includes a pair of electrical terminals (not shown) and an outer housing 1044. The outer housing 1044 includes a first end portion 1046 and a second end portion 1048. The first end portion 1046 is disposed directly on the thermally conductive adhesive portion 54 and is disposed directly above the substantially arcuate-shaped groove 254 of the metal plate 160 such that the thermally conductive adhesive portion 54 fixedly couples the first end portion 1046 of the outer housing 1044 of the pouch-type battery cell 754 to the metal plate 160. The pouch-type battery cell 754 is disposed between the foam layer 899 and the pouch-type battery cell 756.

The pouch-type battery cell 756 includes a pair of electrical terminals (not shown) and an outer housing 1054. The outer housing 1054 includes a first end portion 1056 and a second end portion 1058. The first end portion 1056 is disposed directly on the thermally conductive adhesive portion 56 and is disposed directly above the substantially arcuate-shaped groove 256 of the metal plate 160 such that the thermally conductive adhesive portion 56 fixedly couples the first end portion 1056 of the outer housing 1054 of the pouch-type battery cell 756 to the metal plate 160. The pouch-type battery cell 756 is disposed between the pouch-type battery cell 754 and the foam layer 900. The foam member 900 is disposed between the pouch-type battery cells 756, 758.

The pouch-type battery cell 758 includes a pair of electrical terminals (not shown) and an outer housing 1064. The outer housing 1064 includes a first end portion 1066 and a second end portion 1068. The first end portion 1066 is disposed directly on the thermally conductive adhesive portion 58 and is disposed directly above the substantially arcuate-shaped groove 258 of the metal plate 160 such that the thermally conductive adhesive portion 58 fixedly couples the first end portion 1066 of the outer housing 1064 of the pouch-type battery cell 758 to the metal plate 160. The pouch-type battery cell 758 is disposed between the foam layer 900 and the pouch-type battery cell 760.

The pouch-type battery cell 760 includes a pair of electrical terminals (not shown) and an outer housing 1074. The outer housing 1074 includes a first end portion 1076 and a second end portion 1078. The first end portion 1076 is disposed directly on the thermally conductive adhesive portion 60 and is disposed directly above the substantially arcuate-shaped groove 260 of the metal plate 160 such that the thermally conductive adhesive portion 60 fixedly couples the first end portion 1076 of the outer housing 1074 of the pouch-type battery cell 760 to the metal plate 160. The pouch-type battery cell 760 is disposed between the pouch-type battery cell 758 and the foam layer 901. The foam member 901 is disposed between the pouch-type battery cells 760, 762.

The pouch-type battery cell 762 includes a pair of electrical terminals (not shown) and an outer housing 1084. The outer housing 1084 includes a first end portion 1086 and a second end portion 1088. The first end portion 1086 is disposed directly on the thermally conductive adhesive portion 62 and is disposed directly above the substantially arcuate-shaped groove 262 of the metal plate 160 such that the thermally conductive adhesive portion 62 fixedly couples the first end portion 1086 of the outer housing 1084 of the pouch-type battery cell 762 to the metal plate 160. The pouch-type battery cell 762 is disposed between the foam layer 901 and the pouch-type battery cell 764.

The pouch-type battery cell 764 includes a pair of electrical terminals (not shown) and an outer housing 1094. The outer housing 1094 includes a first end portion 1096 and a second end portion 1098. The first end portion 1096 is disposed directly on the thermally conductive adhesive portion 64 and is disposed directly above the substantially arcuate-shaped groove 264 of the metal plate 160 such that the thermally conductive adhesive portion 64 fixedly couples the first end portion 1096 of the outer housing 1094 of the pouch-type battery cell 764 to the metal plate 160. The pouch-type battery cell 764 is disposed between the pouch-type battery cell 762 and the foam layer 902. The foam member 902 is disposed between the pouch-type battery cells 764, 766.

The pouch-type battery cell 766 includes a pair of electrical terminals (not shown) and an outer housing 1104. The outer housing 1104 includes a first end portion 1106 and a second end portion 1108. The first end portion 1106 is disposed directly on the thermally conductive adhesive portion 66 and is disposed directly above the substantially arcuate-shaped groove 266 of the metal plate 160 such that the thermally conductive adhesive portion 66 fixedly couples the first end portion 1106 of the outer housing 1104 of the pouch-type battery cell 766 to the metal plate 160. The pouch-type battery cell 766 is disposed between the foam layer 902 and the pouch-type battery cell 768.

The pouch-type battery cell 768 includes a pair of electrical terminals (not shown) and an outer housing 1114. The outer housing 1114 includes a first end portion 1116 and a second end portion 1118. The first end portion 1116 is disposed directly on the thermally conductive adhesive portion 68 and is disposed directly above the substantially arcuate-shaped groove 268 of the metal plate 160 such that the thermally conductive adhesive portion 68 fixedly couples the first end portion 1116 of the outer housing 1114 of the pouch-type battery cell 768 to the metal plate 160. The pouch-type battery cell 768 is disposed between the pouch-type battery cell 766 and the foam layer 903. The foam member 903 is disposed between the pouch-type battery cells 768, 770.

The pouch-type battery cell 770 includes a pair of electrical terminals (not shown) and an outer housing 1124. The outer housing 1124 includes a first end portion 1126 and a second end portion 1128. The first end portion 1126 is disposed directly on the thermally conductive adhesive portion 70 and is disposed directly above the substantially arcuate-shaped groove 270 of the metal plate 160 such that the thermally conductive adhesive portion 70 fixedly couples the first end portion 1126 of the outer housing 1124 of the pouch-type battery cell 770 to the metal plate 160. The pouch-type battery cell 770 is disposed between the foam layer 903 and the pouch-type battery cell 772.

The pouch-type battery cell 772 includes a pair of electrical terminals (not shown) and an outer housing 1134. The outer housing 1134 includes a first end portion 1136 and a second end portion 1138. The first end portion 1136 is disposed directly on the thermally conductive adhesive portion 72 and is disposed directly above the substantially arcuate-shaped groove 272 of the metal plate 160 such that the thermally conductive adhesive portion 72 fixedly couples the first end portion 1136 of the outer housing 1134 of the pouch-type battery cell 772 to the metal plate 160. The pouch-type battery cell 772 is disposed between the pouch-type battery cell 770 and the foam layer 904. The foam member 904 is disposed between the pouch-type battery cells 772, 774.

The pouch-type battery cell 774 includes a pair of electrical terminals (not shown) and an outer housing 1144. The outer housing 1144 includes a first end portion 1146 and a second end portion 1148. The first end portion 1146 is disposed directly on the thermally conductive adhesive portion 74 and is disposed directly above the substantially arcuate-shaped groove 274 of the metal plate 160 such that the thermally conductive adhesive portion 74 fixedly couples the first end portion 1146 of the outer housing 1144 of the pouch-type battery cell 774 to the metal plate 160. The pouch-type battery cell 774 is disposed between the foam layer 904 and the pouch-type battery cell 776.

The pouch-type battery cell 776 includes a pair of electrical terminals (not shown) and an outer housing 1154. The outer housing 1154 includes a first end portion 1156 and a second end portion 1158. The first end portion 1156 is disposed directly on the thermally conductive adhesive portion 76 and is disposed directly above the substantially arcuate-shaped groove 276 of the metal plate 160 such that the thermally conductive adhesive portion 76 fixedly couples the first end portion 1156 of the outer housing 1154 of the pouch-type battery cell 776 to the metal plate 160. The pouch-type battery cell 776 is disposed between the pouch-type battery cell 774 and the foam layer 905. The foam member 905 is disposed between the pouch-type battery cells 776, 778.

The pouch-type battery cell 778 includes a pair of electrical terminals (not shown) and an outer housing 1164. The outer housing 1164 includes a first end portion 1166 and a second end portion 1168. The first end portion 1166 is disposed directly on the thermally conductive adhesive portion 78 and is disposed directly above the substantially arcuate-shaped groove 278 of the metal plate 160 such that the thermally conductive adhesive portion 78 fixedly couples the first end portion 1166 of the outer housing 1164 of the pouch-type battery cell 778 to the metal plate 160. The pouch-type battery cell 778 is disposed between the foam layer 905 and the pouch-type battery cell 780.

The pouch-type battery cell 780 includes a pair of electrical terminals (not shown) and an outer housing 1174. The outer housing 1174 includes a first end portion 1176 and a second end portion 1178. The first end portion 1176 is disposed directly on the thermally conductive adhesive portion 80 and is disposed directly above the substantially arcuate-shaped groove 280 of the metal plate 160 such that the thermally conductive adhesive portion 80 fixedly couples the first end portion 1176 of the outer housing 1174 of the pouch-type battery cell 780 to the metal plate 160. The pouch-type battery cell 780 is disposed between the pouch-type battery cell 778 and the foam layer 906. The foam member 906 is disposed between the pouch-type battery cells 780, 782.

The pouch-type battery cell 782 includes a pair of electrical terminals (not shown) and an outer housing 1184. The outer housing 1184 includes a first end portion 1186 and a second end portion 1188. The first end portion 1186 is disposed directly on the thermally conductive adhesive portion 82 and is disposed directly above the substantially arcuate-shaped groove 282 of the metal plate 160 such that the thermally conductive adhesive portion 82 fixedly couples the first end portion 1186 of the outer housing 1184 of the pouch-type battery cell 782 to the metal plate 160. The pouch-type battery cell 782 is disposed between the foam layer 906 and the pouch-type battery cell 784.

The pouch-type battery cell 784 includes a pair of electrical terminals (not shown) and an outer housing 1194. The outer housing 1194 includes a first end portion 1196 and a second end portion 1198. The first end portion 1196 is disposed directly on the thermally conductive adhesive portion 84 and is disposed directly above the substantially arcuate-shaped groove 284 of the metal plate 160 such that the thermally conductive adhesive portion 84 fixedly couples the first end portion 1196 of the outer housing 1194 of the pouch-type battery cell 784 to the metal plate 160. The pouch-type battery cell 784 is disposed between the pouch-type battery cell 782 and the foam layer 907. The foam member 907 is disposed between the pouch-type battery cells 784, 786.

The pouch-type battery cell 786 includes a pair of electrical terminals (not shown) and an outer housing 1204. The outer housing 1204 includes a first end portion 1206 and a second end portion 1208. The first end portion 1206 is disposed directly on the thermally conductive adhesive portion 86 and is disposed directly above the substantially arcuate-shaped groove 286 of the metal plate 160 such that the thermally conductive adhesive portion 86 fixedly couples the first end portion 1206 of the outer housing 1204 of the pouch-type battery cell 786 to the metal plate 160. The pouch-type battery cell 786 is disposed between the foam layer 907 and the pouch-type battery cell 788.

The pouch-type battery cell 788 includes a pair of electrical terminals (not shown) and an outer housing 1214. The outer housing 1214 includes a first end portion 1216 and a second end portion 1218. The first end portion 1216 is disposed directly on the thermally conductive adhesive portion 88 and is disposed directly above the substantially arcuate-shaped groove 288 of the metal plate 160 such that the thermally conductive adhesive portion 88 fixedly couples the first end portion 1216 of the outer housing 1214 of the pouch-type battery cell 788 to the metal plate 160. The pouch-type battery cell 788 is disposed between the pouch-type battery cell 786 and the foam layer 908. The foam member 908 is disposed between the pouch-type battery cell 788 and the end plate 882.

Referring to FIGS. 4 and 17-19, the plastic frame members 810-838 and the end plates 880, 882 are provided to hold the pouch-type battery cells 730-778 at desired locations. The structure of the plastic frame member 810 is identical to the structure of the plastic frame members 812-838.

The plastic frame member 810 is coupled to the end plate 880. The pouch-type battery cell 730 directly contacts and is held between the plastic frame member 810 and the foam layer 893 that is disposed against the end plate 880. The plastic frame member 810 has a top wall 1500, side walls 1502, 1504 and coupling tabs 1506, 1508. The top wall 1500 is coupled to and between a top end of the side wall 1502 and a top end of the side wall 1504. The side walls 1502, 1504 extend substantially parallel to one another in a first direction. The coupling tab 1506 is coupled to a bottom end of the side wall 1502 and extends outwardly in a second direction from the side wall 1502. The second direction is perpendicular to the first direction. The coupling tab 1506 has an aperture 1510 extending therethrough. The coupling tab 1508 is coupled to a bottom end of the side wall 1504 and extends outwardly in a third direction from the second side wall. The third direction is perpendicular to the first direction and opposite to the second direction. The coupling tab 1508 has an aperture 1512 extending therethrough.

Referring to FIGS. 4, 5, 7 and 15, the plastic frame member 812 is disposed between and coupled to the plastic frame members 810, 814. The plastic frame member 812 and the end plate 880 hold the pouch-type battery cell 730 and the foam member 893 therebetween. The plastic frame member 812 includes coupling tabs 1600, 1602 (shown in FIGS. 5 and 7) each having an aperture extending therethrough.

The plastic frame member 814 is disposed between and coupled to the plastic frame members 812, 816. The plastic frame member 814 and the plastic frame member 812 hold the pouch-type battery cell 736, the foam member 895, and the pouch-type battery cell 738 therebetween. The plastic frame member 814 includes coupling tabs 1610, 1612 each having an aperture extending therethrough.

The plastic frame member 816 is disposed between and coupled to the plastic frame members 814, 818. The plastic frame member 816 and the plastic frame member 814 hold the pouch-type battery cell 740, the foam member 896, and the pouch-type battery cell 742 therebetween. The plastic frame member 816 includes coupling tabs 1620, 1622 each having an aperture extending therethrough.

The plastic frame member 818 is disposed between and coupled to the plastic frame members 816, 820. The plastic frame member 818 and the plastic frame member 816 hold the pouch-type battery cell 744, the foam member 897, and the pouch-type battery cell 746 therebetween. The plastic frame member 818 includes coupling tabs 1630, 1632 each having an aperture extending therethrough.

The plastic frame member 820 is disposed between and coupled to the plastic frame members 818, 822. The plastic frame member 820 and the plastic frame member 818 hold the pouch-type battery cell 748, the foam member 898, and the pouch-type battery cell 750 therebetween. The plastic frame member 820 includes coupling tabs 1640, 1642 each having an aperture extending therethrough.

The plastic frame member 822 is disposed between and coupled to the plastic frame members 820, 824. The plastic frame member 822 and the plastic frame member 820 hold the pouch-type battery cell 752, the foam member 899, and the pouch-type battery cell 754 therebetween. The plastic frame member 822 includes coupling tabs 1650, 1652 each having an aperture extending therethrough.

The plastic frame member 824 is disposed between and coupled to the plastic frame members 822, 826. The plastic frame member 824 and the plastic frame member 822 hold the pouch-type battery cell 756, the foam member 900, and the pouch-type battery cell 758 therebetween. The plastic frame member 824 includes coupling tabs 1660, 1662 each having an aperture extending therethrough.

The plastic frame member 826 is disposed between and coupled to the plastic frame members 824, 828. The plastic frame member 826 and the plastic frame member 824 hold the pouch-type battery cell 760, the foam member 901, and the pouch-type battery cell 762 therebetween. The plastic frame member 826 includes coupling tabs 1670, 1672 each having an aperture extending therethrough.

The plastic frame member 828 is disposed between and coupled to the plastic frame members 826, 830. The plastic frame member 828 and the plastic frame member 826 hold the pouch-type battery cell 764, the foam member 902, and the pouch-type battery cell 766 therebetween. The plastic frame member 828 includes coupling tabs 1680, 1682 each having an aperture extending therethrough.

The plastic frame member 830 is disposed between and coupled to the plastic frame members 828, 832. The plastic frame member 830 and the plastic frame member 828 hold the pouch-type battery cell 768, the foam member 903, and the pouch-type battery cell 770 therebetween. The plastic frame member 830 includes coupling tabs 1690, 1692 each having an aperture extending therethrough.

The plastic frame member 832 is disposed between and coupled to the plastic frame members 830, 834. The plastic frame member 832 and the plastic frame member 830 hold the pouch-type battery cell 772, the foam member 904, and the pouch-type battery cell 774 therebetween. The plastic frame member 832 includes coupling tabs 1700, 1702 each having an aperture extending therethrough.

The plastic frame member 834 is disposed between and coupled to the plastic frame members 832, 836. The plastic frame member 834 and the plastic frame member 832 hold the pouch-type battery cell 776, the foam member 905, and the pouch-type battery cell 778 therebetween. The plastic frame member 834 includes coupling tabs 1710, 1712 each having an aperture extending therethrough.

The plastic frame member 836 is disposed between and coupled to the plastic frame members 834, 838. The plastic frame member 836 and the plastic frame member 834 hold the pouch-type battery cell 780, the foam member 906, and the pouch-type battery cell 782 therebetween. The plastic frame member 836 includes coupling tabs 1720, 1722 each having an aperture extending therethrough.

The plastic frame member 838 is disposed between and coupled to the plastic frame member 836 and the end plate 882. The plastic frame member 838 and the plastic frame member 836 hold the pouch-type battery cell 784, the foam member 907, and the pouch-type battery cell 786 therebetween. The plastic frame member 838 and the end plate 882 hold the pouch-type battery cell 788 and the foam member 908 therebetween. The plastic frame member 838 includes coupling tabs 1730, 1732 each having an aperture extending therethrough.

Referring to FIGS. 13, 15, 21 and 22, during assembly, the battery module 120 is positioned relative to the thermal transfer member 22 such that the coupling tabs 1506, 1600, 1610, 1620, 1630, 1640, 1650, 1660, 1670, 1680, 1690, 1700, 1710, 1720, 1730 of the plastic frame members 810, 812, 814, 816, 818, 820, 822, 824, 826, 828, 830, 832, 834, 836, 868, respectively, are disposed in the gaps 440, 442, 444, 446, 448, 450, 452, 454, 456, 458, 460, 462, 464, 466, 468, respectively, of the plastic coupling member 162 of the thermal transfer member 20. Further, the coupling tabs 1508, 1602, 1612, 1622, 1632, 1642, 1652, 1662, 1672, 1682, 1692, 1702, 1712, 1722, 1732 of the plastic frame members 810, 812, 814, 816, 818, 820, 822, 824, 826, 828, 830, 832, 834, 836, 868, respectively, are disposed in the gaps 640, 642, 644, 646, 648, 650, 652, 654, 656, 658, 660, 662, 664, 666, 668, respectively, of the plastic coupling member 164 of the thermal transfer member 20.

Referring to FIGS. 4, 5 and 7, further during assembly, the shoulder bolts 890, 892 and the nuts 888, 889 are utilized to couple the battery module 120 to the thermal transfer member 22, and to couple the plastic frame members 810-838 and the end plates 880, 882 together.

The shoulder bolt 890 has a head portion that abuts against the end plate 882 and a shaft portion that extends through apertures in the coupling tabs 1506, 1600, 1610, 1620, 1630, 1640, 1650, 1660, 1670, 1680, 1690, 1700, 1710, 1720, 1730 of the plastic frame members 810, 812, 814, 816, 818, 820, 822, 824, 826, 828, 830, 832, 834, 836, 838, respectively, and the apertures in the plastic coupling tabs 310, 312, 314, 316, 318, 320, 322, 324, 326, 328, 330, 332, 334, 336, 338, 340 of the plastic coupling member 162 of the thermal transfer member 22. The nut 888 is threadably coupled to a threaded end of the shaft portion of the shoulder bolt 890 and abuts against the end plate 880.

The shoulder bolt 892 has a head portion that abuts against the end plate 882 and a shaft portion that extends through apertures in the coupling tabs 1508, 1602, 1612, 1622, 1632, 1642, 1652, 1662, 1672, 1682, 1692, 1702, 1712, 1722, 1732 of the plastic frame members 810, 812, 814, 816, 818, 820, 822, 824, 826, 828, 830, 832, 834, 836, 838, respectively, and the apertures in the plastic coupling tabs 510, 512, 514, 516, 518, 520, 522, 524, 526, 528, 530, 532, 534, 536, 538, 540 of the plastic coupling member 164 of the thermal transfer member 22. The nut 889 is threadably coupled to a threaded end of the shaft portion of the shoulder bolt 890 and abuts against the end plate 880.

Referring to FIGS. 4, 14, 16, 23 and 24, a flowchart of a method for assembling the battery system 10 in accordance with an exemplary embodiment will be explained. For purposes of simplicity, only a single pouch-type battery cell in the battery module 120 will be described hereinafter.

At step 1800, a user provides the battery system 10 have the thermally conductive base member 20, the thermal transfer member 22, the thermally conductive adhesive portion 30, and the battery module 120. The thermal transfer member 22 has the metal plate 160 with the top portion 170 and the bottom portion 172. The top portion 170 of the metal plate 160 has the substantially arcuate-shaped groove 230 extending inwardly into the metal plate 160. The battery module 120 has the pouch-type battery cell 730. The pouch-type battery cell 730 has the outer housing 914 with the first end portion 916 and the second end portion 918.

At step 1802, the adhesive dispensing device 1900 disposes the thermally conductive adhesive portion 30 in the substantially arcuate-shaped groove 230 of the metal plate 160 of the thermal transfer member 22.

At step 1804, the placement device 1902 positions the battery module 120 such that the first end portion 916 of the outer housing 914 of the pouch-type battery cell 730 is disposed directly on the thermally conductive adhesive portion 30 and directly above the substantially arcuate-shaped groove 230 of the metal plate 160 such that the thermally conductive adhesive portion 30 couples the first end portion 916 of the outer housing 914 of the pouch-type battery cell 730 to the metal plate 160 of the thermal transfer member 22.

At step 1806, the placement device 1902 disposes the bottom portion 172 of the metal plate 160 of the thermal transfer member 22 on the thermally conductive base member 20.

An advantage of the battery system 10 is that battery system 10 utilizes the thermally conductive adhesive portions 30-88 on the thermal transfer member 22 wherein the thermally conductive adhesive portions 30-88 are disposed directly against end portions of pouch-type battery cells of the battery module 120, and the thermal transfer member 22 transfers heat energy from the pouch-type battery cells to the thermally conductive base member 20, without having to use cooling fins disposed between the pouch-type battery cells.

Figure 25:
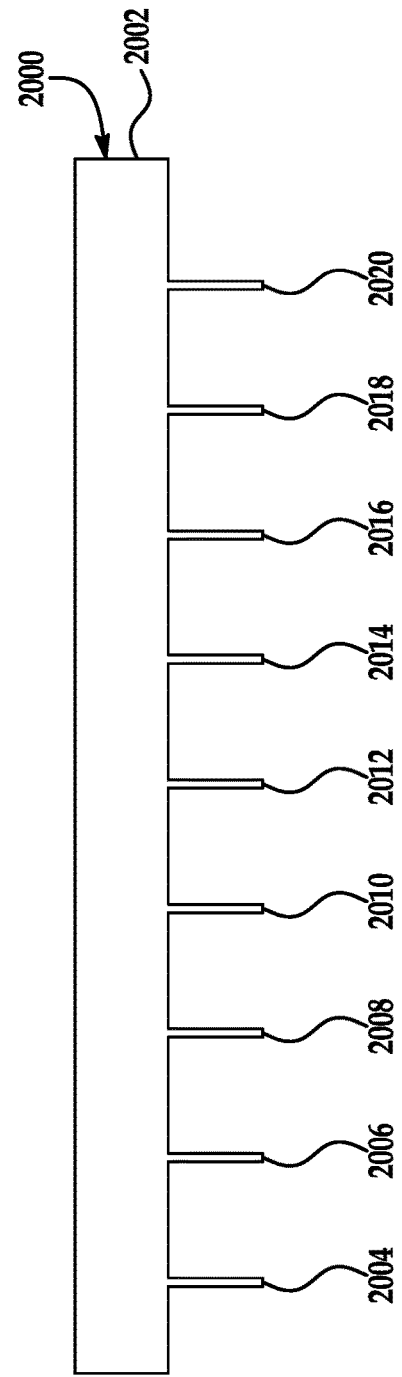
FIG. 25 is a schematic of another thermally conductive base member that can be utilized in the battery system of FIG. 1.

Referring to FIGS. 2 and 25, in an alternative embodiment of the battery system 10, the thermally conductive base member 20 could be replaced with a thermally conductive base member 2000. The thermally conductive base member 2000 includes a base plate 2002 and heat fins 2004, 2006, 2008, 2010, 2012, 2014, 2016, 2018, 2020 that extend downwardly from a bottom surface of the base plate 2002. In this embodiment, the thermal transfer member 22 is disposed on the base plate 2002. The thermally conductive base member 2000 is provided to conduct heat energy from the thermal transfer member 22 to air flowing past the heat fins 2004-2020. In an exemplary embodiment, the base plate 2002 and the heat fins 2004-2020 are constructed of a metal.

Of course, in an alternative embodiment, the base plate 2002 and the heat fins 2004-2020 could be constructed of other thermally conductive materials.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery system, comprising:
    a thermally conductive base member having a housing and a thermally conductive base layer, the thermally conductive base layer being coupled to a top surface of the housing;
    a thermal transfer member having a metal plate with a top portion and a bottom portion, the bottom portion of the metal plate being disposed on the thermally conductive base layer, the top portion of the metal plate having a first substantially arcuate-shaped groove extending inwardly into the metal plate;
    a first thermally conductive adhesive portion being disposed in the first substantially arcuate-shaped groove of the metal plate; and
    a battery module having a first pouch-type battery cell, the first pouch-type battery cell having a first outer housing with a first end portion and a second end portion, the first end portion of the first outer housing of the first pouch-type battery cell being disposed directly on the first thermally conductive adhesive portion and being disposed directly above the first substantially arcuate-shaped groove of the metal plate such that the first thermally conductive adhesive portion fixedly couples the first end portion of the first outer housing of the first pouch-type battery cell to the metal plate.

2. The battery system of claim 1, wherein:
    the top portion of the metal plate further includes second substantially arcuate-shaped groove extending inwardly into the metal plate, the second substantially arcuate-shaped groove extending substantially parallel to the first substantially arcuate-shaped groove;
    the battery system further having a second thermally conductive adhesive portion being disposed in the second substantially arcuate-shaped groove of the metal plate; and
    the battery module further having a second pouch-type battery cell, the second pouch-type battery cell having a second outer housing with a first end portion and a second end portion, the first end portion of the second outer housing of the second pouch-type battery cell being disposed on the second thermally conductive adhesive portion and being disposed directly above the second substantially arcuate-shaped groove of the metal plate such that the second thermally conductive adhesive portion fixedly couples the first end portion of the second outer housing of the second pouch-type battery cell to the metal plate.

3. The battery system of claim 2, wherein a major surface of the first outer housing of the first pouch-type battery cell directly contacts a major surface of the second outer housing of the second pouch-type battery cell.

4. The battery system of claim 1, wherein a width of the first substantially arcuate-shaped groove is substantially equal to a width of the first end portion of the first outer housing of the first pouch-type battery cell.

5. The battery system of claim 4, wherein a depth of the first substantially arcuate-shaped groove is substantially equal to a height of the first end portion of the first outer housing of the first pouch-type battery cell.

6. The battery system of claim 1, wherein the metal plate is an extruded aluminum plate.

7. The battery system of claim 1, wherein the first thermally conductive adhesive portion is a silicon-based thermally conductive adhesive.

8. The battery system of claim 1, wherein the first thermally conductive adhesive portion is an epoxy-based thermally conductive adhesive.

9. The battery system of claim 1, wherein the first thermally conductive adhesive portion has a thermal conductivity in a range of 1.0-4.0 Watts per meter-Kelvin.

10. The battery system of claim 1, wherein the battery module further includes a first plastic frame member disposed against the first outer housing of the first pouch-type battery cell; the first plastic frame member having a top wall, first and second side walls, and first and second coupling tabs;
    the top wall being coupled to and between a top end of the first side wall and a top end of the second side wall;
    the first and second side walls extending substantially parallel to one another in a first direction;
    the first coupling tab being coupled to a bottom end of the first side wall and extending outwardly in a second direction from the first side wall, the second direction being perpendicular to the first direction; the first coupling tab having a first aperture extending therethrough; and
    the second coupling tab being coupled to a bottom end of the second side wall and extending outwardly in a third direction from the second side wall, the third direction being perpendicular to the first direction and opposite to the second direction; the second coupling tab having a second aperture extending therethrough.

11. The battery system of claim 10, wherein the thermal transfer member further includes first and second plastic coupling tabs coupled to and extending outwardly from first and second ends, respectively, of the metal plate; the first and second plastic coupling tabs having first and second apertures, respectively extending therethrough;
    the thermal transfer member being disposed against the battery module such that the first and second apertures of the first and second plastic coupling tabs, respectively, of the thermal transfer member are aligned with the first and second apertures, respectively, of the first and second coupling tabs, respectively, of the first plastic frame member.

12. The battery system of claim 11, further comprising first and second bolts;
    the first bolt being disposed through the first aperture of the first plastic coupling tab of the thermal transfer member and the first aperture of the first coupling tab of the first plastic frame member to couple the thermal transfer member to the first plastic frame member of the battery module; and
    the second bolt being disposed through the second aperture of the second plastic coupling tab of the thermal transfer member and the second aperture of the second coupling tab of the first plastic frame member to couple the thermal transfer member to the second plastic frame member of the battery module.

13. The battery system of claim 1, wherein the housing of the thermally conductive base member has an enclosed interior region, the thermally conductive base member further having an inlet port and an outlet port being coupled to the thermally conductive base member that fluidly communicates with the enclosed interior region.

14. A method for assembling a battery system, comprising:

providing a thermally conductive base member, a thermal transfer member, a first thermally conductive adhesive portion, and a battery module; the thermal transfer member having a metal plate with a top portion and a bottom portion, the top portion of the metal plate having a first substantially arcuate-shaped groove extending inwardly into the metal plate; the battery module having a first pouch-type battery cell, the first pouch-type battery cell having a first outer housing with a first end portion and a second end portion;

disposing the first thermally conductive adhesive portion in the first substantially arcuate-shaped groove of the metal plate, utilizing an adhesive dispensing device;

positioning the battery module such that the first end portion of the first outer housing of the first pouch-type battery cell is disposed directly on the first thermally conductive adhesive portion and directly above the first substantially arcuate-shaped groove of the metal plate, utilizing a placement machine, such that the first thermally conductive adhesive portion couples the first end portion of the first outer housing of the first pouch-type battery cell to the metal plate of the thermal transfer member; and disposing the bottom portion of the metal plate of the thermal transfer member on the thermally conductive base member, utilizing the placement device.

* * * * *